United States Patent
Yamamori et al.

(10) Patent No.: US 9,522,969 B2
(45) Date of Patent: Dec. 20, 2016

(54) METHOD FOR PRODUCING METHACRYLIC POLYMER COMPOSITION, AND MOLDED ARTICLE

(71) Applicant: SUMITOMO CHEMICAL COMPANY, LIMITED, Tokyo (JP)

(72) Inventors: Akihiro Yamamori, Tokyo (JP); Takao Wake, Ehime (JP); Kazuhiro Yamazaki, Ehime (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/649,076

(22) PCT Filed: Nov. 29, 2013

(86) PCT No.: PCT/JP2013/082750
§ 371 (c)(1),
(2) Date: Jun. 2, 2015

(87) PCT Pub. No.: WO2014/088082
PCT Pub. Date: Jun. 12, 2014

(65) Prior Publication Data
US 2016/0185884 A1   Jun. 30, 2016

(30) Foreign Application Priority Data
Dec. 3, 2012 (JP) ................. 2012-264021

(51) Int. Cl.
*C08F 20/14* (2006.01)
*C08F 220/14* (2006.01)
(Continued)

(52) U.S. Cl.
CPC ............ *C08F 20/14* (2013.01); *C08F 220/14* (2013.01); *C09D 133/08* (2013.01)

(58) Field of Classification Search
CPC ............... C08F 2/02; C08F 2/38; C08F 20/14; C08F 2500/05
(Continued)

(56) References Cited

U.S. PATENT DOCUMENTS 3,474,081 A * 10/1969 Bosworth ............... C08F 20/14
526/329.7
4,246,382 A   1/1981 Honda et al.
(Continued)

FOREIGN PATENT DOCUMENTS

CN   1189507 A   8/1998
CN   1303397 A   7/2001
(Continued)

OTHER PUBLICATIONS

International Search Report (English translation), Form, PCT/ISA/210, International Application No. PCT/JP2013/082750, mailed Mar. 11, 2014, 2 pages.
(Continued)

*Primary Examiner* — Fred M Teskin
(74) *Attorney, Agent, or Firm* — Rothwell, Figg, Ernst & Manbeck, P.C.

(57) ABSTRACT

A method for producing a methacrylic polymer composition, which comprises
a first polymerization step wherein a raw material composition A comprising a raw material monomer A containing no less than 50% by weight of methyl methacrylate, a polymerization initiator A, and a chain transfer agent A is supplied into a first complete mixing type reactor through a supply port of the reactor; and
a second polymerization step wherein a raw material composition B comprising a raw material monomer B containing no less than 50% by weight of methyl methacrylate, a polymerization initiator B, and a chain
(Continued)

transfer agent B, and the intermediate composition withdrawn in the first polymerization step are supplied into a second complete mixing type reactor through a supply port of the reactor.

4 Claims, 13 Drawing Sheets

(51) Int. Cl.
 C08F 2/02 (2006.01)
 C08F 2/38 (2006.01)
 C09D 133/08 (2006.01)
(58) Field of Classification Search
 USPC .................................................. 526/65, 329.7
 See application file for complete search history.

(56) References Cited

U.S. PATENT DOCUMENTS

| | | | |
|---|---|---|---|
| 5,898,055 | A | 4/1999 | Moriya et al. |
| 6,632,907 | B1 | 10/2003 | Mizota et al. |
| 2009/0239050 | A1 | 9/2009 | Azuma et al. |
| 2012/0196127 | A1 | 8/2012 | Murakami |

FOREIGN PATENT DOCUMENTS

| | | |
|---|---|---|
| CN | 102477200 A | 5/2012 |
| CN | 102675487 A | 9/2012 |
| CN | 102702339 A | 10/2012 |
| EP | 0 652 237 A2 | 5/1995 |
| EP | 2 500 363 A1 | 3/2012 |
| EP | 2 457 950 A1 | 5/2012 |
| EP | 2 481 476 A1 | 8/2012 |
| JP | S54-149788 A | 11/1979 |
| JP | S58-101140 A | 6/1983 |
| JP | H06-240093 A | 8/1994 |
| JP | H07-206905 A | 8/1995 |
| JP | H07-206906 A | 8/1995 |
| JP | 2004-211105 A | 7/2004 |
| JP | 2006-193647 A | 7/2006 |
| JP | 2006-298966 A | 11/2006 |
| JP | 2008-538794 A | 11/2008 |
| JP | 2010-59305 A | 3/2010 |
| JP | 2011-38022 A | 2/2011 |
| JP | 2011-168683 A | 9/2011 |
| JP | 2012-12564 A | 1/2012 |
| JP | 2012-153807 A | 8/2012 |
| JP | 2012-214618 A | 11/2012 |
| WO | 2006/114576 A1 | 11/2006 |
| WO | 2007/060891 A2 | 5/2007 |
| WO | 2011/049203 A1 | 4/2011 |
| WO | 2012117039 A1 | 9/2012 |

OTHER PUBLICATIONS

Written Opinion of the ISA (English translation, Form PCT/ISA/237, International Application No. PCT/JP2013/082750, mailed Mar. 11, 2014, 6 pages.
International Preliminary Report on Patentability (English translation), Form PCT/IB/373 (form PCT/ISA/237 attached), International Application No. PCT/JP2013/082750, issued Jun. 9, 2015, 7 pages.
Japanese Office Action dated Jun. 7, 2016, issued in Japanese Patent Application No. 2012-264021, 7 pages.
European Search Report dated Apr. 8, 2016, EP Application No. 13860754.4-1301 / 2927249 PCT/JP2013082750, Applicant: Sumitomo Chemical Co., Ltd., 7 pages.
China Elastomerics, vol. 16, No. 4, Aug. 15, 2009, pp. 70-73, Abstract attached, 4 pages.
Chinese Master's Theses Full-Text Database, Engineering Science and Technology, Series I, Feb. 15, 2012, B016-113, Abstract attached, 59 pages.
First Chinese Office Action (with English Translation attached) dated as Apr. 2016, CN Application No. 201380072087, Nov. 29, 2013, 13 pages.

* cited by examiner

METHOD FOR PRODUCING
METHACRYLIC POLYMER COMPOSITION,
AND MOLDED ARTICLE

CROSS-REFERENCE TO RELATED APPLICATIONS

The present application is a national stage filing under 35 U.S.C. §371 of PCT/JP2013/082750, filed on 29 Nov. 2013, and related to and claims priority to Japanese Application No. 2012-264021, filed 3 Dec. 2012. Each application is incorporated herein in their entirety.

TECHNICAL FIELD

The present invention relates to a method for producing a methacrylic polymer composition, and a molded article obtained/obtainable from the methacrylic polymer composition obtained/obtainable by the method.

BACKGROUND ART

Methacrylic resin composition has superior transparency and weather durability. The methacrylic resin composition is utilized as a molding material for a light guide plate, which is used as a member of a backlight unit for various types of liquid crystal displays, or for vehicle members such as a rear lamp cover, a head lamp cover, a meter panel, and so on (See Patent Literatures 1 and 2).

As a methacrylic resin composition, there is a known composition containing a higher molecular weight polymer and a lower molecular weight polymer (See Patent Literatures 3-7). The methacrylic polymer composition containing both of the higher molecular weight polymer and the lower molecular weight polymer has advantages such as a broader molecular weight distribution as well as a superior solvent resistance and a superior flowability for molding. As a method for producing a methacrylic resin composition comprising a higher molecular weight polymer and a lower molecular weight polymer, some methods are suggested such as a method comprising an addition of methyl methacrylate and methyl acrylate in the presence of a methacrylic resin obtained by a suspension polymerization, and a subsequent suspension polymerization (See, for example, Patent Literature 3); a method comprising a bulk polymerization and a subsequent additional bulk polymerization by adding an initiator and a chain transfer agent (See, for example, Patent Literature 4), and a method comprising separate preparing of methacrylic resins having different average molecular weights, respectively, and subsequently blending the separately prepared resins (See, for example, Patent Literatures 5-7), etc.

CITATION LIST

Patent Literatures

PATENT LITERATURE 1: JP H06-240093 A
PATENT LITERATURE 2: JP 2006-298966 A
PATENT LITERATURE 3: WO 2011-049203 A
PATENT LITERATURE 4: JP S54-149788 A
PATENT LITERATURE 5: JP S58-101140 A
PATENT LITERATURE 6: JP 2008-538794 A
PATENT LITERATURE 7: JP 2010-059305 A
PATENT LITERATURE 8: JP 2004-211105 A

SUMMARY OF INVENTION

Problems to be Solved by Invention

In the conventional method for producing a methacrylic resin composition having a broad molecular weight distribution, there are disadvantages in transparency, productivity and controlling of molecular weight distribution. For example, in the method comprising separately preparing methacrylic resins having different average molecular weights, respectively, and blending the separately prepared resins, the method requires an extruding step, a dewatering step or a drying step, or the like, as a process, when the separately prepared resins are produced in a pellet form or a powder form, respectively, and an additional extruding step is required during the blending of the resins. On the other hand, the multi-stage polymerization has efficiency since the desired product can be obtained in a single extrusion process.

Method for achieving the multi-stage polymerization includes a suspension polymerization process, a solution polymerization process and a bulk polymerization process. In the multi-stage polymerization process comprising suspension polymerizations, if a methacrylic polymer composition is produced, transparency of the composition is decreased since dispersion stabilizing agent or emulsifier is used (See Patent Literature 7).

Generally, in the case of the solution polymerization, there are occurrences of problems such that the resistance to the thermal decomposition of the resulting polymer is decreased due to the solvent, and the process for collecting the solvent and monomer(s) is complicated.

In the case of the bulk polymerization, controls of the reactions are difficult, since viscosity of the reaction mixture is increased. As a method wherein the reactions can be controlled in two-stage polymerizations by using of bulk polymerizations, without any solvent, there is a known method wherein a polymerization takes place until the polymerization conversion within a range from 1 to 50% is achieved, and then, a chain transfer agent is additionally added to carry out the polymerization until no less than 60% of the polymerization conversion is achieved (See Patent Literature 4). However, in these procedures, the conditions for the first polymerization comprise temperature of 130° C. and the time period of 2 hours, and the conditions for the second polymerization comprise temperature of 60° C. and the time period of 10 hours. According to this method, the polymerization is carried out again under milder polymerization conditions, in the second state, than those of the first stage. Therefore, this method needs a long time period, and gives insufficient productivity.

In order to increase the productivity in the bulk polymerization, it is desired to shorten the time period for the polymerization and increase the polymerization conversion.

In the continuous solution polymerization process disclosed in Patent Literature 4, the chain transfer agent is not diluted with the monomer to be added to the second reactor, and the chain transfer agent is directly added to the reactor (See Examples). As a result, control of the concentration of the chain transfer agent in the reactor becomes to be difficult. In Patent Literature 4, the supply amount of the chain transfer agent is smaller, the amount being no more than 1/50 compared to the flow rate of the monomer. Therefore, if supply amount of the chain transfer agent is varied, even by a slight amount, the concentration of the chain transfer agent in the reactor is varied, and physical properties of the resulting polymer are varied such as flowability. Accordingly, in this method, it is difficult to stably obtain any polymer having the desired physical properties by the continuous bulk polymerization.

In the method employing two-stage bulk polymerizations disclosed in Patent Literature 8, the amount of the chain transfer agent to be added into the second reactor is small. The concentration of the chain transfer agent in the first reactor is approximately same to that in the second reactor. Therefore, in this method, polymers having almost the same molecular weights are generated in the first and second stages, respectively. Thus, a sufficiently broad molecular weight distribution is not achieved.

Accordingly, objects of the present invention consist in controlling the ratio or proportion of the lower molecular weight polymer to the higher molecular weight polymer, and providing a method for efficiently producing a methacrylic polymer composition having a broader molecular weight distribution. Furthermore, objects of the present invention consist in providing a molded article obtained/obtainable from the methacrylic polymer composition obtained/obtainable by the method described above.

Means for Solving Problems

The present invention provides those described in the following items [1]-[5]:

[1]
A method for producing a methacrylic polymer composition, which comprises
a first polymerization step wherein a raw material composition A comprising a raw material monomer A containing no less than 50% by weight of methyl methacrylate, a polymerization initiator A, and a chain transfer agent A is supplied into a first complete mixing type reactor through a supply port of the reactor, and the raw material composition A is subjected to a continuous bulk polymerization in the first complete mixing type reactor, and a resulting intermediate composition is withdrawn through an effluent port of the first complete mixing type reactor; and
a second polymerization step wherein a raw material composition B comprising a raw material monomer B containing no less than 50% by weight of methyl methacrylate, a polymerization initiator B, and a chain transfer agent B, and the intermediate composition withdrawn in the first polymerization step are supplied into a second complete mixing type reactor through a supply port of the reactor, and the raw material composition B and the intermediate composition are further subjected to a continuous bulk polymerization in the second complete mixing type reactor, and a resulting methacrylic polymer composition is withdrawn through an effluent port of the second complete mixing type reactor;
wherein the following formulae (I), (II), (III), (IV) and (V) are satisfied:

$$120 \leq T1 \leq 160 \quad \text{(I)}$$

$$140 \leq T2 \leq 180 \quad \text{(II)}$$

$$20 \leq T2 - T1 \leq 60 \quad \text{(III)}$$

$$1.7 \leq [S2]/[S1] \quad \text{(IV)}$$

$$1 \leq Q1/Q2 \leq 50 \quad \text{(V)}$$

wherein
T1 is a temperature (° C.) in the first complete mixing type reactor in the first polymerization step, T2 is a temperature (° C.) in the second complete mixing type reactor in the second polymerization step,

[S1] is a concentration (% by weight) of the chain transfer agent A in the raw material composition A supplied into the first complete mixing type reactor,

[S2] is a concentration (% by weight) of the chain transfer agent B relative to the total amount of the raw material composition B and the intermediate composition, both of which are supplied into the second complete mixing type reactor, Q1 is a flow rate ($cm^3$/min) of the intermediate composition supplied into the second complete mixing type reactor, and Q2 is a flow rate ($cm^3$/min) of the raw material composition B supplied in the second complete mixing type reactor.

[2]
The method for producing a methacrylic polymer composition according to the above-described item [1], wherein the following formulae (VI) and (VII) are further satisfied:

$$40 \leq x \leq 60 \quad \text{(VI)}$$

$$\theta1 + \theta2 \leq 180 \quad \text{(VII)}$$

wherein
x is a polymerization conversion (% by weight) of the methacrylic polymer composition withdrawn through the effluent port of the second complete mixing type reactor, $\theta1$ is an average residence time (min) in the first complete mixing type reactor in the first polymerization step, and $\theta2$ is an average residence time (min) in the second complete mixing type reactor in the second polymerization step.

[3]
The method according to the above-described item [1] or [2], wherein each of the effluent ports of the first and second complete mixing type reactors is located on a top of each of the reactors.

[4]
The method according to any one of the above-described items [1]-[3], wherein the continuous bulk polymerizations in the first polymerization step and the second polymerization step are conducted under adiabatic conditions.

[5]
A molded article obtained/obtainable from the methacrylic polymer composition produced by the method according to any one of the above-described items [1]-[4].

Effects of Invention

According to the present invention, a mixture containing a lower molecular weight polymer and a higher molecular weight polymer can be continuously and easily produced. Consequently, a methacrylic polymer composition can be produced in a higher productivity, wherein the molecular weight distribution is broader and the mixing ratio of the lower molecular weight polymer and the higher molecular weight polymer is controlled. The methacrylic polymer composition obtained/obtainable by the method according to the present invention can be preferably utilized as a material for a molded article.

DESCRIPTION OF EMBODIMENTS

Figure 1:
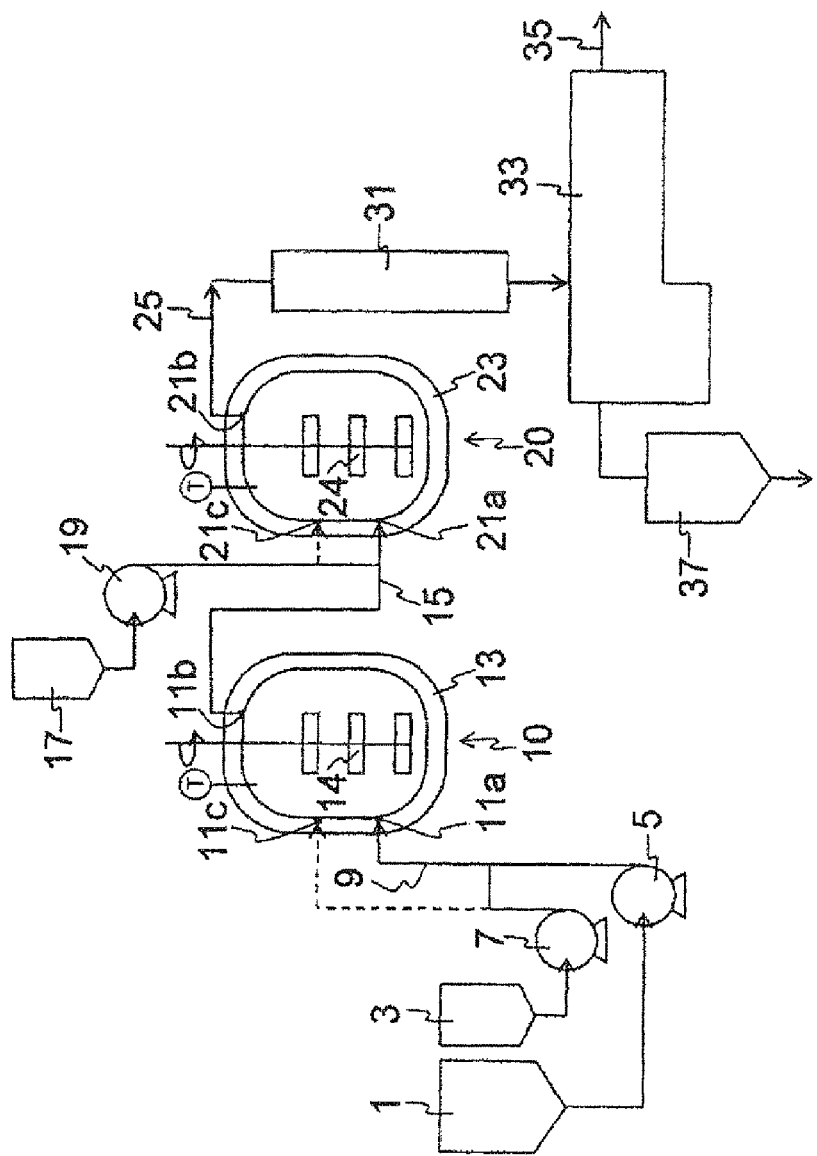
FIG. 1 is schematic view for explaining the method for producing a methacrylic polymer composition as one embodiment according to the present invention.

The present inventive method for producing the methacrylic polymer composition (hereinafter, which is also simply referred to as "polymer composition") is conducted by using at least two complete mixing type reactors. In each of the reactors, a continuous bulk polymerization is conducted.

Hereinafter, one embodiment of the present invention is described in detail with referring to FIG. 1. Herein, the following embodiment is described with the aim of an exemplification. Therefore, the present invention is not limited to that embodiment.

Initially, an apparatus to be used for carrying out the method for producing the polymer composition according to the present embodiment is described below. The method for producing the polymer composition according to the present embodiment is carried out by using at least two, or a first reactor 10 and a second reactor 20. Both of these reactors 10 and 20 are complete mixing type, respectively, and these reactors can be used to conduct continuous bulk polymerizations, in this embodiment, as continuous polymerizations in the first polymerization step and the second polymerization step, respectively.

More specifically, the first reactor 10 is provided with a supply port 11a and an effluent port 11b, and preferably further provided with a jacket 13 surrounding the outer surface of the reactor as a temperature regulating means for adjusting a temperature of the outer surface of the reactor, and a stirrer 14 for stirring the contents therein. Similarly, the second reactor 20 is provided with a supply port 21a and an effluent port 21b, and preferably further provided with a jacket 23 surrounding the outer surface of the reactor as a temperature regulating means for adjusting a temperature of the outer surface of the reactor, and a stirrer 24 for stirring the contents therein. The effluent ports 11b and 21b are provided to be located at the top of each of the reactors. On the other hand, the supply ports 11a and 21a may be generally located at an appropriate position of the lower part of each of the reactors, although this embodiment is not limited thereto. Each of these reactors 10 and 20 may be provided with a temperature sensor T as a temperature detecting means for detecting a temperature in the reactor.

The first reactor 10 and the second reactor 20 may have the same or different inner volume from each other. Making the inner volume of the first reactor 10 and the inner volume of the second reactor 20 to be different from each other is possible to effectively differentiate between the first reactor 10 and the second reactor 20 in the average residence time, respectively.

The stirrers 14 and 24 may be a member for substantially attaining a complete mixing condition(s) in the reactors, respectively.

These stirrers may have any appropriate stirring blade(s), for example, may have blades of MIG impeller, MAXBLEND impeller (registered trademark, manufactured by Sumitomo Heavy Industries, Ltd.), paddle impeller, double helical ribbon impeller, FULLZONE impeller (registered trademark, manufactured by Kobelco Eco-Solutions Co., Ltd.), and so on. In order to increase stirring effect in the reactor, it is preferable to provide the reactor with a baffle(s). However, this embodiment is not limited thereto, but may have any appropriate configuration(s) in place of the stirrers 14 and 24 as long as a complete mixing condition(s) can be substantially attained in the reactors.

In general, the reactors 10 and 20 are more preferable when they have a higher stirring efficiency. However, in view of avoiding the reactors from being added with an unnecessary amount of heat by the stirring operation, it is preferable that a power of stirring is not more than necessary. The power of stirring is not particularly limited, but preferably within a range from 0.5 to 20 kW/m$^3$, and more preferably within a range from 1 to 15 kW/m$^3$. As a viscosity of the reaction system becomes higher (or a content ratio of a polymer in the reaction system becomes higher), it is preferable to set the power of stirring at a larger level.

As shown in the drawings, the supply port 11a of the first reactor 10 is connected through a raw material supply line 9 to a raw material monomer tank (or a supply source of a raw material monomer(s) and, if necessary, of a chain transfer agent(s)) 1 and a polymerization initiator tank (a supply source of a polymerization initiator(s) and, if necessary, of a raw material monomer(s) and/or a chain transfer agent(s)) 3 via pumps 5 and 7, respectively. In this embodiment, the supply sources of the raw material monomer, the polymerization initiator and the chain transfer agent to the first reactor 10 are the raw material monomer tank 1 and the polymerization initiator tank 3. However, the number of the supply source(s) of the raw material monomer, the polymerization initiator and the chain transfer agent, the state of the raw material monomer, the polymerization initiator and the chain transfer agent (in a case of mixture, for example, formulation thereof) and so on are not particularly limited as long as the raw material monomer, the polymerization initiator, and the chain transfer agent can be supplied to the first reactor 10, appropriately. Although it is not necessary for this embodiment, but other supply port 11c may be provided to the first reactor 10 and this supply port 11c may be connected to the polymerization initiator tank 3 via the pump 7, for example, as shown by a dotted line in FIG. 1. The effluent port 11b of the first reactor 10 may be connected to the supply port 21a of the second reactor 20 through a connection line 15. The effluent port 21b of the second reactor 20 is linked up to an effluent line 25. Thus, the first reactor 10 and the second reactor 20 are connected in series. There is preferably no pump on the connection line 15 between the effluent port 11b of the first reactor 10 and the supply port 21a of the second reactor 20.

The second reactor 20 is connected to a polymerization initiator tank (an additional supply source of a raw material monomer(s), a polymerization initiator(s) and a chain transfer agent(s)) 17 via a pump 19. In this embodiment, the additional supply source of the raw material monomer, the polymerization initiator and the chain transfer agent is the polymerization initiator tank 17, but the number of the additional supply source(s) of the raw material monomer, the polymerization initiator and the chain transfer agent, and the state of the raw material monomer, the polymerization initiator and the chain transfer agent (in a case of mixture, for example, formulation thereof) and so on are not particularly limited as long as the additional raw material monomer, the additional polymerization initiator and the additional chain transfer agent can be supplied to the second reactor 20, appropriately. The supply port 21a of the second reactor 20 may be connected to the polymerization initiator tank 17 via the pump 19 through the connection line 15 as shown in FIG. 1, or the second reactor 20 may be provided with other supply port 21*c* so that this supply port 21*c* may be connected to the polymerization initiator tank 17 via the pump 19 as shown by, for example, a dotted line in FIG. 1.

The pumps 5, 7 and 19 are not particularly limited, but are preferably pumps being able to set flow rate from the raw material monomer tank 1, flow rate from the polymerization initiator tank 3, and flow rate from the polymerization initiator tank 17 at constant values, respectively. Specifically, multiple reciprocating pumps are preferred, and more preferred are pulsation-free controlled-volume pumps such as a duplicate pulsation-free controlled-volume pump and a triplex pulsation-free controlled-volume pump. By using these, it is possible to control supply amounts (or supply flow rates, which also apply hereinafter) of the raw material monomer, the polymerization initiator, and the chain transfer agent to the first reactor 10, and additional supply amounts of the raw material monomer, the polymerization initiator, and the chain transfer agent to the second reactor 20.

Furthermore, it is preferable that the connection line 15 which connects the effluent port 11*b* of the first reactor 10 to the supply port 21*a* of the second reactor 20 comprises a jacket (not shown in the drawings) surrounding the outer surface of the connection line 15, as a temperature regulating means which can adjust the temperature of the connection line 15, or the like, although the jacket is not always necessary for the present embodiment. Thus, the temperature of the connection line 15 (more specifically, the temperature of the outer surface of the connection line, consequently the temperature in the connection line) can be adjusted so that the temperature substantially corresponds to the temperature in the first reactor 10. As described in the present embodiment, if the first reactor 10 has a temperature sensor T as a temperature detecting means for detecting the temperature in the first reactor 10, the temperature regulating means on the connection line 15 can be controlled so that the temperature of the connection line 15 substantially corresponds to the temperature in the first reactor 10 to be detected by the temperature sensor T.

It is preferable that each of the members described in the above with reference to FIG. 1 is appropriately connected to a control device (not shown in the drawings) and construct the whole so as to enable the control device to control their operations. Thereby, in order to set the temperature of the outer surface of the reactor set for each of the jackets (as a temperature regulating means) 13 and 23 to correspond to the temperature in the reactor detected by a temperature sensor (as a temperature detecting means) T, with respect to each of the first reactor 10 and the second reactor 20, these temperatures can be controlled by adjusting the supply amounts of the raw material monomer, the polymerization initiator and the chain transfer agent to the first reactor 10 by controlling the operations of the pumps 5 and 7, respectively, or by adjusting the temperature of the outer surface of the reactor set for each of the jackets 13 and 23, or by adjusting the additional supply amounts of the raw material monomer, the polymerization initiator and the chain transfer agent to the second reactor 20 by controlling the operation of the pump 19. Alternatively, so that the temperature in the connection line 15 substantially corresponds to the temperature in the first reactor 10 detected by the temperature sensor (or the temperature detecting means) T, these temperatures can be controlled by adjusting the temperature of the outer surface of the connection line, which is set for the jacket (or the temperature regulating means which is not shown in the drawings) covering the connection line 15. It is preferable that the temperature in the connection line 15 is actually determined by the temperature detecting means for detecting the temperature in the connection line 15. However, in some cases, depending on the polymerization reaction conditions in the first reactor 10, due to some causes such as that all of the supplied polymerization initiator is spent, an intermediate composition (hereinafter, which is described) taken from the effluent port 11*b* does not let the polymerization reaction proceed in the connection line 15, that is, no heat of the polymerization reaction may be generated in the connection line 15. In such case, the temperature of the jacket covering the connection line 15 can be set at the substantially same temperature to the temperature in the first reactor 10, or the connection line 15 can be covered by a heat insulating material instead of the jacket. Thereby, the temperature in the connection line 15 can be set at the substantially same temperature to the temperature in the first reactor 10. In this case, it can be believed that the temperature in the connection line 15 substantially corresponds to the temperature of the jacket covering the connection line 15.

The jackets 13 and 23 surround almost the whole of the reactors 10 and 20, respectively to appropriately heat or retain the heat of the reactors 10 and 20 by introducing heat medium such as steam, hot water, organic heat medium or the like from a heat medium supply route (not shown in the drawings). The temperatures of the jackets 13 and 23 are able to be appropriately regulated with a temperature or pressure of the heat medium to be introduced. The heat medium introduced into the jackets 13 and 23 is removed from a heat medium discharge route (not shown in the drawings).

The temperatures and/or pressures of the jackets 13 and 23 can be detected by a sensor such as a temperature sensor (not shown in the drawings) located on the heat medium discharge route. The point of location of a sensor such as the temperature sensor is not particularly limited, but it may be located, for example, on the heat medium supply route, or in the jackets 13 and 23. Herein, if the connection line 15 has a jacket, the jacket for the connection line 15 may have a structure similar to that of each of the jackets 13 and 23.

For the polymerization reactions in the reactors 10 and 20, it is required to proceed at a generally constant polymerization temperature in each of the reactors 10 and 20 in view of obtaining a polymer with a constant quality. Therefore, the above-described temperature regulating means (or jackets 13 and 23) can be controlled at a constant temperature which has been set beforehand, so that the temperatures inside the reactors 10 and 20 can be maintained respectively at a generally constant temperature.

The setting temperature of the above-described temperature regulating means (or jacket 13 or 23) is transmitted to a supply flow rate controlling means described below, to be used as data for determining whether control of the supply flow rate with the raw material monomer supply means (or pump 5) and/or the polymerization initiator supply means (or pump 7 or pump 19) is necessary or not. The setting temperature of the above-described temperature regulating means (or jackets 13 and 23) can be regulated by controlling the temperature or pressure of the above-described heat medium.

Examples of the supply flow rate controlling means include, for example, a control unit (not shown in the drawings) provided with CPU, ROM, RAM, and so on.

The ROM of the control unit is a device for storing a program which controls the pumps 5, 7 and 19, and so on. The RAM of the control unit is a device for temporary storing data of the temperatures in the reactors 10 and 20 detected by the temperature sensor T, data of the setting temperatures of the jackets 13 and 23, and data of the setting temperature of the jacket, if present, of the connection line 15 in order to execute the above program.

The CPU of the control unit executes the program stored in the above ROM based on data such as the data of the temperatures in the reactors 10 and 20 and the data of the setting temperatures of the jackets 13 and 23 stored in the above RAM so that the supply flow rates of the raw material monomer, the polymerization initiator and/or the chain transfer agent to the reactors 10 and 20 is controlled by the raw material monomer supply means (or pump 5) and/or the polymerization initiator supply means (or pumps 7 and 19). In the case of that the connection line 15 has a jacket as the temperature regulating means, the CPU of the control unit can execute the program stored in the above ROM (which may be either a part of the above program, or other program than the above program) based on data such as the data of the temperatures in the reactors 10 and 20 and the data of the setting temperature of the jacket (not shown in the drawings) on the connection line 15 stored in the above RAM, in order to adjust the setting temperature of the jacket of the connection line 15.

An example of the control by the supply flow rate controlling means (or a control unit) will be described below.

When the temperature in the reactor 10 detected by the temperature sensor T exceeds the setting temperature of the jacket 13 as the temperature regulating means, the above-described CPU executes the program in the above-described ROM to control, for example, the pump 7 so as to decrease the supply flow rate of the polymerization initiator into the reactor 10. When the temperature in the reactor 20 detected by the temperature sensor T exceeds the setting temperature of the jacket 23 as the temperature regulating means during the pump 19 supplies the polymerization initiator to the reactor 20 to conduct the polymerization, the CPU executes the program in the ROM to control, for example, the pump 19 so as to decrease the supply flow rate of the polymerization initiator into the reactor 20. By conducting such controls, polymerization heat generated in the reactors 10 and/or 20 can be decreased, and thereby the temperatures in the reactors 10 and/or 20 can be lowered.

On the other hand, when the temperature in the reactor 10 is below the setting temperature of the jacket 13, the CPU executes the program in the ROM to control, for example, the pump 7 so as to increase the supply flow rate of the polymerization initiator into the reactor 10. When the temperature in the reactor 20 is below the setting temperature of the jacket 23 during the pump 19 supplies the polymerization initiator to the reactor 20 to conduct the polymerization, the CPU executes the program in the ROM to control, for example, the pump 19 so as to increase the supply flow rate of the polymerization initiator into the reactor 20. By conducting such control, polymerization heat generated in the reactors 10 and/or 20 can be increased, and thereby temperatures in the reactors 10 and/or 20 can be raised.

Alternatively, for example, when the control over the pumps 7 and 19 for the polymerization reactions in the reactors 10 and 20 results in remarkable decrease in the total of the supply flow rates into the reactors 10 and 20, it is preferable to not only control the pumps 7 and 19 to decrease the supply flow rate of the polymerization initiator, but also to control the pump 5 so as to increase the supply flow rate of the raw material monomer at the same time.

Further, as other example of the control, the following control is noted. That is, when the temperature in the reactor 10 detected by the temperature sensor T exceeds the setting temperature of the jacket 13 as the temperature regulating means, the pump 5 is controlled to increase the supply flow rate of the raw material monomer, so that the relative supply flow rate of the polymerization initiator into the reactor 10 is decreased. By conducting such controls, the temperature in the reactor 10 can also be lowered.

A ratio of the supply flow rate of the raw material monomer to the supply flow rate of the polymerization initiator can be appropriately set depending on the kind of the polymer to be generated, the kind of the polymerization initiator to be used, and so on.

Also, degree of increase or decrease in the supply flow rate of the raw material monomer and/or the supply flow rate of the polymerization initiator can be appropriately set depending on the kind of the polymer to be generated, the kind of the polymerization initiator to be used, and so on. However, the polymerization initiator may be not supplied alone in the reactor 10 by the polymerization initiator supply means. In the case of that a mixture of a polymerization initiator and a raw material monomer and/or a chain transfer agent is supplied thereto, and in the case of a mixture of a polymerization initiator, a raw material monomer and a chain transfer agent to be supplied into the reactor 20, it is necessary to consider a content ratio of the polymerization initiator in the mixture to control the supply flow rate of the polymerization initiator.

Furthermore, as other example of the control, if the connection line 15 has a jacket as the temperature regulating means, the controls described below are available. Accordingly, if the temperature in the reactor 10 detected by the temperature sensor T is different from the temperature in the connection line 15 (or, conveniently, the determined temperature of the jacket on the connection line 15), for example, if the difference is beyond the range of ±5° C., the determined temperature of the jacket on the connection line 15 can be adjusted, so that the temperature in the connection line 15 (or, conveniently, the determined temperature of the jacket on the connection line 15) substantially corresponds to the temperature of the reactor 10.

Additionally, it is not necessary for this embodiment, but a preheater 31 and a devolatilizing extruder 33 may be located downstream of the effluent line 25 from the effluent port 21b of the second reactor 20. There may be a pressure adjusting valve (not shown in the drawings) provided between the preheater 31 and the devolatilizing extruder 33. An extruded object after devolatilization can be discharged from a discharge line 35.

As the preheater 31, any appropriate heater can be used as long as it is able to heat a viscous fluid. As the devolatilizing extruder 33, a single or multi screw devolatilizing extruder can be used.

Furthermore, there may be a recovery tank 37 for storing the raw material monomer(s) which is separated and recovered from a volatile component(s) (comprising unreacted raw material monomer(s), mainly) separated with the devolatilizing extruder 33.

Next, a process for producing a polymer composition conducted by using such apparatus will be described. In this embodiment, a case of conducting continuous polymerizations of a monomer(s) comprising methyl methacrylate, in the other words, a case of producing a methyl methacrylate-based polymer(s) will be described, as an example, although the present invention is not limited thereto.

<Raw Material Monomer, Polymerization Initiator, Chain Transfer Agent and Other Components>

At first, the raw material monomer, the polymerization initiator, the chain transfer agent, and the like, are prepared.

A monomer(s) comprising methyl methacrylate can be employed, as the raw material monomer, in this embodiment.

In the present specification, the raw material monomer to be supplied into the first reactor 10 is also referred to as raw material monomer A. The raw material monomer to be additionally supplied into the second reactor 20 is also referred to as raw material monomer B. The raw material monomers A and B, as a composition, respectively, may have the same formulation, or may have different formulation from each other.

According to the present invention, the raw material monomer(s) contain(s) no less than 50% by weight of methyl methacrylate.

Containing no less than 50% by weight of methyl methacrylate can give features such as transparency, weather durability and heat resistance to the resulting methacrylic resin composition, which are characteristic of the methacrylic resin. The content of methyl methacrylate in the raw material monomer is preferably no less than 80% by weight, and more preferably no less than 90% by weight.

In addition to the methyl methacrylate, the raw material monomer(s) may comprise other monomer(s) copolymerizable with the methyl methacrylate. The other monomer(s) can be used alone, or can be used in a combination of at least two monomers. The content of the copolymerizable other monomer(s) in the raw material monomer(s) is 50% by weight or less, preferably 20% by weight or less, and more preferably 10% by weight or less.

The other monomer copolymerizable with the methyl methacrylate includes, for example, alkyl methacrylates (or alkyl methacrylates having alkyl group having 2-8 carbon atoms) such as ethyl methacrylate, n-propyl methacrylate, isopropyl methacrylate, n-butyl methacrylate, t-butyl methacrylate, sec-butyl methacrylate, isobutyl methacrylate, and 2-ethylhexyl methacrylate; aryl methacrylates such as benzyl methacrylate; acrylic acid esters such as methyl acrylate, ethyl acrylate, n-propyl acrylate, isopropyl acrylate, n-butyl acrylate, t-butyl acrylate, sec-butyl acrylate, isobutyl acrylate, 2-ethylhexyl acrylate and benzyl acrylate; unsaturated carboxylic acids or acid anhydrides thereof such as acrylic acid, methacrylic acid, maleic acid, itaconic acid, maleic acid anhydride, and itaconic acid anhydride; hydroxyl group-containing monomers such as 2-hydroxyethyl acrylate, 2-hydroxypropyl acrylate, monoglycerol acrylate, 2-hydroxyethyl methacrylate, 2-hydroxypropyl methacrylate, and monoglycerol methacrylate; nitrogen-containing monomers such as acrylamide, methacrylamide, acrylonitrile, methacrylonitrile, diacetoneacrylamide, and dimethylaminoethyl methacrylate; epoxy group-containing monomers such as allyl glycidyl ether, glycidyl acrylate, and glycidyl methacrylate; styrene-based monomers such as styrene, α-methylstyrene, and divinylbenzene; diesters of unsaturated carboxylic acids and glycols such as ethylene glycol dimethacrylate, and butane diol dimethacrylate; unsaturated carboxylic acid alkenyl esters such as allyl acrylate, allyl methacrylate, and allyl cinnamate; polybasic acid polyalkenyl esters such as diallyl phthalate, diallyl maleate, triallyl cyanurate, and triallyl isocyanurate; esters of unsaturated carboxylic acids and polyalcohols such as trimethylolpropane triacrylate; and the like.

In the present specification, the polymerization initiator to be supplied into the first reactor 10 is also referred to as polymerization initiator A. The polymerization initiator to be additionally supplied into the second reactor 20 is also referred to as polymerization initiator B. The polymerization initiators A and B, as a composition, respectively, may have the same formulation, or may have different formulation from each other.

As the polymerization initiator, for example, a radical initiator is used in this embodiment.

Examples of the radical initiator include azo compounds such as azobisisobutyronitrile, azobisdimethylvaleronitrile, azobiscyclohexanenitrile, 1,1'-azobis(1-acetoxy-1-phenylethane), dimethyl 2,2'-azobisisobutylate, and 4,4'-azobis-4-cyanovaleric acid; organic peroxides such as benzoyl peroxide, lauroyl peroxide, acetyl peroxide, caprylyl peroxide, 2,4-dichlorobenzoyl peroxide, isobutyl peroxide, acetyl cyclohexylsulfonyl peroxide, t-butyl peroxypivalate, t-butyl peroxyneodecanoate, t-butyl peroxyneoheptanoate, t-butyl peroxy-2-ethylhexanoate, 1,1-di(t-butylperoxy)cyclohexane, 1,1-di(t-butylperoxy)-3,3,5-trimethylcyclohexane, 1,1-di(t-hexylperoxy)-3,3,5-trimethylcyclohexane, diisopropyl peroxydicarbonate, diisobutyl peroxydicarbonate, di-sec-butyl peroxydicarbonate, di-n-butyl peroxydicarbonate, bis(2-ethylhexyl) peroxydicarbonate, bis(4-t-butylcyclohexyl) peroxydicarbonate, t-amyl peroxy-2-ethylhexanoate, 1,1,3,3-tetramethyl butyl peroxy-ethylhexanoate, 1,1,2-trimethyl propyl peroxy-2-ethylhexanoate, t-butyl peroxy isopropyl monocarbonate, t-amyl peroxy isopropyl monocarbonate, t-butyl peroxy-2-ethylhexyl carbonate, t-butyl peroxy allyl carbonate, t-butyl peroxy isopropyl carbonate, 1,1,3,3-tetramethyl butyl peroxy isopropyl monocarbonate, 1,1,2-trimethyl propyl peroxy isopropyl monocarbonate, 1,1,3,3-tetramethyl butyl peroxy isononate, 1,1,2-trimethyl propyl peroxy-isononate, and t-butyl peroxybenzoate.

These polymerization initiators may be used alone, or may be used in a combination of at least two of them.

The polymerization initiator can be selected depending on the kinds of the polymer to be produced and the raw material monomer to be used. For example, the preferable radical polymerization initiators are those having half-life within 1 minute at their polymerization temperatures, respectively, but the present invention is not particularly limited therewith. In the case of the half-life at the polymerization temperature is within 1 minute, the reaction rate is not too small, and therefore, it is suitable to the polymerization reactions in the continuous polymerization apparatus. It is preferable that the half-life at the polymerization temperature is 0.1 second or more. In the case of that the half-life is less than 0.1 second, there may be occurrences of problems such that the line is obstructed, and the like, since sudden polymerization occurs at the connected part to the reactor.

The supply amount of the polymerization initiator (or radical initiator) is not particularly limited, but may be selected so that the total of the supply amounts of the polymerization initiator(s) supplied to the reactor 10 and the reactor 20 is within a range generally from 0.001 to 1% by weight with respect to the sum of the raw material monomer eventually supplied to the reactor 10 and the raw material monomer additionally supplied to the reactor 20.

In the present specification, the chain transfer agent to be supplied into the first reactor 10 is also referred to as chain transfer agent A. The chain transfer agent to be additionally supplied into the second reactor 20 is also referred to as chain transfer agent B. The chain transfer agents A and B, as a composition, respectively, may have the same formulation, or may have a different formulation from each other. The chain transfer agent can be used for adjusting the molecular weight of the produced polymer.

As to the chain transfer agent, either monofunctional or polyfunctional chain transfer agent can be used. More specifically, examples of the chain transfer agent include alkyl mercaptans such as n-propyl mercaptan, isopropyl mercaptan, n-butyl mercaptan, t-butyl mercaptan, n-hexyl mercaptan, n-octyl mercaptan, 2-ethylhexyl mercaptan, n-dodecyl mercaptan, and t-dodecyl mercaptan; aromatic mercaptans such as phenyl mercaptan and thiocresol; mercaptans having 18 or less carbon atoms such as ethylene thioglycol; polyalcohols such as ethylene glycol, neopentyl glycol, trimethylolpropane, pentaerythritol, dipentaerythritol, tripentaerythritol, and sorbitol; those of which hydroxyl group is esterified with thioglycolic acid or 3-mercaptopropionic acid, 1,4-dihydronaphthalene, 1,4,5,8-tetrahydronaphthalene, R-terpinene, terpinolene, 1,4-cyclohexadiene, hydrogen sulfide, and so on. These chain transfer agents may be used alone as a single, or may be used in any combination of at least two of them.

In addition to the raw material monomer, the polymerization initiator and the chain transfer agent, which are described above, any appropriate other component(s), for example, a mold release agent, a rubbery polymer such as butadiene and styrene-butadiene rubber (SBR), a thermal stabilizing agent, and an ultraviolet absorbing agent may be used. The mold release agent can be used for improving moldability of a resin composition obtained from the polymer composition. The thermal stabilizing agent can be used for preventing a produced polymer from thermal degradation. The ultraviolet absorbing agent can be used for preventing a produced polymer from being degraded by ultraviolet rays.

Examples of the mold release agents are not particularly limited, but include esters of higher fatty acids, higher fatty alcohols, higher fatty acids, higher fatty acid amides, metal salts of higher fatty acids, and so on. These mold release agents may be used alone as a single, or may be used in any combination of at least two of them.

Examples of the esters of higher fatty acids specifically include, for example, saturated fatty acid alkyl esters such as methyl laurate, ethyl laurate, propyl laurate, butyl laurate, octyl laurate, methyl palmitate, ethyl palmitate, propyl palmitate, butyl palmitate, octyl palmitate, methyl stearate, ethyl stearate, propyl stearate, butyl stearate, octyl stearate, stearyl stearate, myristyl myristate, methyl behenate, ethyl behenate, propyl behenate, butyl behenate, and octyl behenate; unsaturated fatty acid alkyl esters such as methyl oleate, ethyl oleate, propyl oleate, butyl oleate, octyl oleate, methyl linoleate, ethyl linoleate, propyl linoleate, butyl linoleate, and octyl linoleate; saturated fatty acid glycerides such as lauric monoglyceride, lauric diglyceride, lauric triglyceride, palmitic monoglyceride, palmitic diglyceride, palmitic triglyceride, stearic monoglyceride, stearic diglyceride, stearic triglyceride, behenic monoglyceride, behenic diglyceride, and behenic triglyceride; unsaturated fatty acid glycerides such as oleic monoglyceride, oleic diglyceride, oleic triglyceride, linolic monoglyceride, linolic diglyceride, and linolic triglyceride. Among them, methyl stearate, ethyl stearate, butyl stearate, octyl stearate, stearic monoglyceride, stearic diglyceride, stearic triglyceride, and son on are preferred.

Examples of the higher fatty alcohols specifically include, for example, saturated fatty (or aliphatic) alcohols such as lauryl alcohol, palmityl alcohol, stearyl alcohol, isostearyl alcohol, behenyl alcohol, myristyl alcohol, and cetyl alcohol; unsaturated fatty (or aliphatic) alcohols such as oleyl alcohol, and linolyl alcohol. Among them, stearyl alcohol is preferred.

Examples of the higher fatty acids specifically include, for example, saturated fatty acids such as caproic acid, caprylic acid, capric acid, lauric acid, myristic acid, palmitic acid, stearic acid, arachidic acid, behenic acid, lignoceric acid, and 12-hydroxyoctadecanoic acid; unsaturated fatty acids such as palmitoleic acid, oleic acid, linoleic acid, linolenic acid, cetoleic acid, erucic acid, and ricinoleic acid.

Examples of the higher fatty acid amides specifically include, for example, saturated fatty acid amides such as lauric acid amide, palmitic acid amide, stearic acid amide, and behenic acid amide; unsaturated fatty acid amides such as oleic acid amide, linoleic acid amide, and erucic acid amide; amides such as ethylene-bis-lauric acid amide, ethylene-bis-palmitic acid amide, ethylene-bis-stearic acid amide, and N-oleyl stearamide. Among them, stearic acid amide and ethylene-bis-stearic acid amide are preferred.

Examples of the metal salts of higher fatty acids include, for example, sodium salts, potassium salts, calcium salts and barium salts of the above-described higher fatty acids, and so on.

An amount of the mold release agent to be used is preferably adjusted in a range from 0.01 to 1.0 part by weight, and more preferably adjusted in a range from 0.01 to 0.50 part by weight, with respect to 100 parts by weight of a polymer contained in a polymer composition to be obtained.

Examples of the thermal stabilizing agent are not particularly limited, but include, for example, phosphorous-based thermal stabilizing agent and organic disulfide compounds, and the like. Among them, the organic disulfide compounds are preferable. These thermal stabilizing agents may be used alone as a single, or may be used in any combination of at least two of them.

Examples of the phosphorus-based thermal stabilizing agent include, for example, tris(2,4-di-t-butylphenyl)phosphite, 2-[[2,4,8,10-tetrakis(1,1-dimethylethyl)dibenzo [d,f][1,3,2]dioxaphosphepine-6-yl]oxy]-N,N-bis[2-[[2,4,8,10-tetrakis(1,1-dimethylethyl)dibenzo [d,f][1,3,2]dioxaphosphepine-6-yl]oxy]-ethyl]ethanamine, diphenyl tridecyl phosphite, triphenyl phosphite, 2,2-methylenebis(4,6-di-tert-butylphenyl)octylphosphite, bis(2,6-di-tert-butyl-4-methylphenyl)pentaerythritol diphosphite, and so on. Among them, 2,2-methylenebis(4,6-di-tert-butylphenyl)octylphosphite is preferred.

Examples of the organic disulfide compounds include, for example, dimethyl disulfide, diethyl disulfide, di-n-propyl disulfide, di-n-butyl disulfide, di-sec-butyl disulfide, di-tert-butyl disulfide, di-tert-amyl disulfide, dicyclohexyl disulfide, di-tert-octyl disulfide, di-n-dodecyl disulfide, di-tert-dodecyl disulfide, and so on. Among them, di-tert-alkyl disulfide is preferred, and di-tert-dodecyl disulfide is more preferred.

An amount of the thermal stabilizing agent to be used is preferably within a range from 1 to 2,000 ppm by weight with respect to a polymer contained in a polymer composition to be obtained. On molding a polymer composition (or, more specifically, a resin composition after devolatilization) to prepare a molded article from the polymer composition according to the present invention, a molding temperature may be set at a higher temperature for the purpose of improving its molding processability in some cases. Use of such thermal stabilizing agent is more effective for such case.

As a kind of the ultraviolet absorbing agent, a benzophenone-based ultraviolet absorbing agent, a cyanoacrylate-based ultraviolet absorbing agent, a benzotriazole-based ultraviolet absorbing agent, a malonic ester-based ultraviolet absorbing agent, an oxalic anilide-based ultraviolet absorbing agent and so on are exemplified. These ultraviolet absorbing agents may be used alone, or may be used in any combination of at least two of them. Among them, the benzotriazole-based ultraviolet absorbing agent, the malonic ester-based ultraviolet absorbing agent, and the oxalic anilide-based ultraviolet absorbing agent are preferable.

Examples of the benzophenone-based ultraviolet absorbing agent include, for example, 2,4-dihydroxybenzophenone, 2-hydroxy-4-methoxybenzophenone, 2-hydroxy-4-methoxybenzophenone-5-sulfonic acid, 2-hydroxy-4-octyloxybenzophenone, 4-dodecyloxy-2-hydroxybenzophenone, 4-benzyloxy-2-hydroxybenzophenone, 2,2'-dihydroxy-4,4'-dimethoxybenzophenone, and so on.

Examples of the cyanoacrylate-based ultraviolet absorbing agent include, for example, ethyl 2-cyano-3,3-diphenylacrylate, 2-ethylhexyl 2-cyano-3,3-diphenylacrylate, and so on.

Examples of the benzotriazole-based ultraviolet absorbing agent include, for example, 2-(2-hydroxy-5-methylphenyl)-2H-benzotriazole, 5-chloro-2-(3,5-di-tert-butyl-2-hydroxyphenyl)-2H-benzotriazole, 2-(3-tert-butyl-2-hydroxy-5-methylphenyl)-5-chloro-2H-benzotriazole, 2-(3,5-di-tert-pentyl-2-hydroxyphenyl)-2H-benzotriazole, 2-(3,5-di-tert-butyl-2-hydroxyphenyl)-2H-benzotriazole, 2-(2H-benzotriazole-2-yl)-4-methyl-6-(3,4,5,6-tetrahydrophthalimidylmethyl)phenol, 2-(2-hydroxy-5-tert-octylphenyl)-2H-benzotriazole, and so on.

As to the malonic ester-based ultraviolet absorbing agent, 2-(1-aryl alkylidene)malonates are generally used, and examples thereof include dimethyl 2-(p-methoxybenzylidene)malonate, and so on.

As to the oxalic anilide-based ultraviolet absorbing agent, 2-alkoxy-2'-alkyloxalic anilides are generally used, and examples thereof include 2-ethoxy-2'-ethyloxalic anilide, and so on.

An amount of the ultraviolet absorbing agent to be used is preferably within a range of from 5 to 1,000 ppm by weight with respect to a polymer contained in a polymer composition to be obtained.

In the raw material monomer tank 1, the raw material monomer (in one kind or a mixture of two or more kinds thereof) as described above is appropriately formulate together with the chain transfer agent (and other component(s) such as the mold release agent as the case may be), if necessary. In the polymerization initiator tank 3, the polymerization initiator as described above is appropriately formulate together with the raw material monomer and/or the chain transfer agent, if necessary (and other component(s) such as the mold release agent as the case may be). The polymerization initiator tank 3 may store the polymerization initiator alone, or may store a form of the mixture of the raw material monomer and the polymerization initiator (may further comprise other component(s) such as the mold release agent as the case may be). The polymerization initiator tank may store the polymerization initiator in a form of the mixture of the raw material monomer, the polymerization initiator and the chain transfer agent (may further comprise other component(s) such as the mold release agent as the case may be). The chain transfer agent supplied into the first reactor 10 may be contained in at least one of the mixtures such as the mixture containing the raw material monomer to be combined in the raw material monomer tank 1 as well as the mixture containing the polymerization initiator to be combined in the polymerization initiator tank 3.

At a polymerization initiator tank 17, the above-described polymerization initiator is appropriately combined together with the raw material monomer and the chain transfer agent (and other component(s), if necessary). In the polymerization initiator tank 17, the polymerization initiator is stored in a form of a mixture containing the raw material monomer, the polymerization initiator and the chain transfer agent (which may additionally comprise other component(s), if necessary).

In the case of that a supply port 11c is communicated with the polymerization initiator tank 3 via a pump 7, or in the case of that a supply port 21c is communicated with the polymerization initiator tank 17 via a pump 19, the polymerization initiator may be solely stored in the polymerization initiator tank 3 or 17, and the polymerization initiator may be solely supplied into the reactor 10 or the reactor 20. Therefore, there is a possibility that local polymerization reaction takes place at the reactor 10 or the reactor 20. Whereas, in the case of that it is stored in a form of a mixture containing the raw material monomer and the polymerization initiator, the polymerization initiator is previously combined with a part of the raw material monomer. Therefore, such possibilities can be removed.

<First Polymerization Step>

In the first polymerization step, a raw material composition comprising the raw material monomer(s), the polymerization initiator(s) and the chain transfer agent(s) is supplied to the first reactor. In the present specification, the raw material composition to be supplied into the first reactor is also referred to as raw material composition A.

The raw material monomer, the polymerization initiator and the chain transfer agent are supplied into the first reactor 10 through the supply port 11a from the raw material monomer tank 1 and the polymerization initiator tank 3 as the supply sources of the raw material monomer, the polymerization initiator, and the chain transfer agent. Specifically, the raw material monomer(s), and the chain transfer agent(s), if necessary, are supplied from the raw material monomer tank 1 by the pump 5, and the polymerization initiator (preferably, the mixture of the raw material monomer and the polymerization initiator, and the chain transfer agent, if necessary) is supplied from the polymerization initiator tank 3 by the pump 7, and they merge together through the raw material supply line 9 into the first reactor 10 via the supply port 11a. Also, the polymerization initiator may be supplied from the polymerization initiator tank 3 by the pump 7 to the first reactor 10 via the supply port 11c as shown by the dotted line in FIG. 1.

For supplying the polymerization initiator into the first reactor 10, when the mixture of the raw material monomer(s) and the polymerization initiator(s), and the chain transfer agent(s), if necessary, is prepared in the polymerization initiator tank 3 and supplied therefrom, it is preferable to adjust a ratio A:B within a range from 80:20 to 98:2 wherein A represents the supply flow rate ($cm^3$/min) of the raw material monomer (or the raw material monomer and the chain transfer agent, if necessary) from the raw material monomer tank 1, and B represents the supply flow rate ($cm^3$/min) of the mixture containing the raw material monomer and the polymerization initiator, and the chain transfer agent, if necessary (or a mixture having a content proportion of the polymerization initiator within a range from 0.002 to 10% by weight) from the polymerization initiator tank 3.

The temperature of the raw material composition to be supplied to the first reactor 10 is not particularly limited. However, this is one of factors which may change the polymerization temperature by losing heat balance in the reactor, and therefore it is preferable to adjust the temperature appropriately by a heater/cooler (not shown in the drawings) before supplying it into the reactor 10.

The raw material composition to be supplied to the first reactor 10 as described in the above are subjected to a continuous bulk polymerization in the first reactor 10 (in other words, polymerization with no solvent). This first polymerization step has only to proceed the polymerization reaction partway, and an intermediate composition is taken from the effluent port 11b of the first reactor 10.

In the first polymerization step, it is preferable that the continuous bulk polymerization can be conducted under a condition(s) in which the reactor is filled with the reaction mixture while substantially no gas phase is present (hereinafter, which may be referred to as a fully filled condition(s)). The fully filled condition(s) can prevent beforehand the occurrences of the problems such as that gel adheres to and grows on the inner surface of the reactor, and that this gel is contaminated into the reaction mixture to degrade quality of a polymer composition obtained in the end. Furthermore, the fully filled conditions enable all of the inner volume of the reactor to be effectively used as a reaction space, and thereby a high productivity can be attained.

By locating the effluent port 11b of the first reactor 10 at the reactor's top, the fully filled conditions can be conveniently realized simply by conducting the supply to and the taking from the first reactor 10, continuously.

Furthermore, in the first polymerization step, it is preferable that the continuous bulk polymerization may be conducted under the adiabatic condition(s) (or condition(s) with substantially no heat transfer to or from outside of the reactor). The adiabatic condition(s) can prevent beforehand the occurrences of the problems such as that gel adheres to and grows on the inner surface of the reactor, and that this gel is contaminated into the reaction mixture to degrade quality of a resin composition obtained in the end. Furthermore, the adiabatic conditions enable the polymerization reaction to become stable, and self regulating characteristics for suppressing a runaway reaction(s) can be brought about.

The adiabatic condition(s) can be realized by making the temperature of the inside of the first reactor 10 and the temperature of the outer surface thereof generally equal to each other. More specifically, this can be realized, with the use of the above-described control device (not shown in the drawings), by the supply amounts of the raw material monomer and the polymerization initiator into the first reactor 10 by adjusting the operations of the pumps 5 and 7 such that the temperature of the outer surface of the first reactor 10 set for the jacket (as a temperature regulating means) 13 and the temperature in the first reactor 10 detected by the temperature sensor (as a temperature detecting means) T correspond to each other. If the temperature of the outer surface of the reactor is set much higher than the temperature in the reactor, it may add extra amount of heat into the reactor.

The smaller the difference between the temperature in the reactor and the temperature of the outer surface of the reactor is, the better it is. More specifically, it is preferable to adjust the temperature difference within the range of ± about 5° C. Polymerization heat and stirring heat, which are generated in the first reactor 10, are generally taken away together with the intermediate composition being withdrawn from the first reactor 10. The heat amount taken away by the intermediate composition depends on the flow rate of the intermediate composition, specific heat, and temperature of the polymerization reaction.

The temperature of the continuous bulk polymerization in the first polymerization step can be understood as the temperature in the first reactor 10 (which is detected by the temperature sensor T). The first polymerization step is conducted at a temperature in the range from 120 to 160° C., preferably at a temperature in the range from 120 to 150° C. It is noted, however, that the temperature in the reactor may be changed according to various conditions until it reaches a static state. In the case of that the continuous bulk polymerization is conducted under an adiabatic condition(s), the temperature of the first reactor 10 depends on the heat of the polymerization. A higher concentration of the polymerization initiator in the raw material composition supplied into the first reactor 10 gives a higher polymerization conversion. As a result, the temperature in the first reactor 10 can be increased.

The pressure of the continuous bulk polymerization in the first polymerization step can be understood as the pressure in the first reactor 10. This pressure is set at a pressure not less than a vapor pressure of the raw material monomer at the temperature in the reactor to prevent gas of the raw material monomer from generating in the reactor, and is generally within a range from about 1.0 to 2.0 MPa in gauge pressure.

A time period subjected to the continuous bulk polymerization in the first polymerization step can be understood as an average residence time in the first reactor 10. The average residence time in the first reactor 10 can be set according to the productivity of the polymer in the intermediate composition, and so on. A shorter average residence time reaching to the determined polymerization conversion gives a higher productivity. Therefore, a shorter average residence time is preferable. It is more preferable that the average residence time is set within a range from 15 minutes to 2 hours and 45 minutes. The average residence time in the first reactor 10 can be adjusted by using pumps 5 and 7 to change the supply amount (or supply flow rate) of the raw material monomer, or the like, to the first reactor 10.

As described in the above, the intermediate composition is taken from the effluent port 11b of the first reactor 10. The obtained intermediate composition comprises the generated polymer(s) and the unreacted raw material monomer(s), and may further comprise the unreacted polymerization initiator(s), decomposed substance(s) of the polymerization initiator(s), and so on.

The polymerization conversion in the intermediate composition is, preferably, within a range from 30 to 50% by weight. The polymerization conversion in the intermediate composition corresponds to the content proportion of the polymer in the intermediate composition.

<Second Polymerization Step>

The second polymerization step is conducted in series with and following to the first polymerization step.

The resulting intermediate composition as described in the above is withdrawn or taken from the effluent port 11b of the first reactor 10, and then, through the connection line 15, supplied into the second reactor 20 from a supply port 21a. Then, the intermediate composition is further subjected to a continuous bulk polymerization in the second reactor 20. This second polymerization step is to let the polymerization reaction proceed to the desired polymerization conversion. The resulting polymer composition (or polymerization syrup) is continuously withdrawn or taken from the effluent port 21b of the second reactor 20.

Hereinafter, the second polymerization step will be described mainly with respect to the different points from the first polymerization step, and explanations similar to those for the first polymerization step are applied thereto unless particularly otherwise explained.

In the second polymerization step, a raw material composition containing a raw material monomer(s), a polymerization initiator(s) and a chain transfer agent(s) is supplied to the second reactor in addition to the above-described intermediate composition. In the present specification, the raw material composition to be supplied into the second reactor is also referred to as raw material composition B.

Specifically, the raw material composition containing a raw material monomer(s), a polymerization initiator(s) and a chain transfer agent(s) is supplied from a polymerization initiator tank 17 to the second reactor 20, via a supply port 21a or an additional supply port 21c, through a connection line 15 by a pump 19. Thus, an additional polymerization initiator may be added to the intermediate composition.

Alternatively, while the raw material composition B is prepared, during a raw material composition containing a raw material monomer(s) and a polymerization initiator(s) is transferred, in a liquid form, from the polymerization initiator tank 17 to the connection line 15 by the pump 19, it is combined with a chain transfer agent in a liquid form, which has been stored in other tank than the polymerization initiator tank 17 and transferred from the other pump than the pump 19, by controlling the flow rates of these two pumps, respectively. Thereby, a desired concentration of the chain transfer agent can be achieved.

Temperature of the raw material composition B to be supplied from the polymerization initiator tank 17 to the second reactor 20 is not particularly limited. However, it is preferable that the temperature is appropriately adjusted by a heater/a cooler (not shown in the drawings) before supplying it to the reactor 20. Otherwise, thermal balance in the reactor may be deteriorated or affected, and the polymerization temperature may be varied. It is preferable that the content of the polymerization initiator contained in the raw material composition B is within a range from 0.002 to 10% by weight.

A sufficient amount of the chain transfer agent is added to the second reactor 20. Thereby, in the second reactor 20, a polymer having a smaller average molecular weight than that of the polymer obtained in the first reactor 10 can be produced. A higher concentration of the chain transfer agent can produce a polymer having a smaller average molecular weight. Therefore, when the supply amount of the chain transfer agent to the second reactor 20 is increased, the difference between the average molecular weight of the polymer obtained in the first reactor 10 and that of the polymer obtained in the second reactor 20 becomes large. Accordingly, the molecular weight distribution can be broadened. Herein, [S1] is defined as a concentration (in % by weight) of a chain transfer agent(s) in a raw material composition (containing a raw material monomer(s), a polymerization initiator(s) and a chain transfer agent(s), and other component(s), if necessary) supplied into the first reactor. [S2] is defined as a concentration (in % by weight) of a chain transfer agent(s) relative to total amount of a raw material composition (containing a raw material monomer(s), a polymerization initiator(s) and a chain transfer agent(s), and other component(s), if necessary) and the intermediate composition, both of which are supplied into the second reactor. In the method according to the present invention, the supply amount of the chain transfer agent is adjusted so as to satisfy the following formula:

$$1.7 \leq [S2]/[S1]$$

Preferably, the supply amount of the chain transfer agent is adjusted so as to satisfy the following formula.

$$2.0 \leq [S2]/[S1]$$

The upper limit of the ratio, or [S2]/[S1] is not particularly limited, but it is preferably 100 or less, more preferably 50 or less, yet more preferably 20 or less, particularly preferably 15 or less, and most preferably 10 or less.

The value of [S1] is preferably less than 0.2, more preferably less than 0.14. When the value of [S1] is 0.2 or more, while a strand extruded from an extruder is withdrawn to a pelletizer and formed into pellets, mechanical strengths of the strand sometimes may be decreased. Therefore, the strand sometimes may be break down, or generation of fine powders sometimes may be increased.

The lower limit of the value of [S1] is preferably 0.05. When the value of [S1] is less than 0.05, the molecular weight of the polymer obtained in the first reactor is increased. Therefore, the viscosity of the syrup in the first reactor sometimes may be increased. As a result, it may become to be difficult to be uniformly stirred in the first reactor, or to be transferred therefrom in a liquid form. Herein, there is a possibility that a runaway reaction occurs in the first reactor due to the increased viscosity of the syrup. Herein, burden on the extruder sometimes may be increased since the resulting polymer has an increased average molecular weight.

Furthermore, it is preferable that the value of [S2] satisfies with the following formula.

$$0 < [S2] \leq 1$$

It is preferable that the upper limit of the value of [S2] is 1. When the value of [S2] is more than 1, the viscosity of the polymer obtained in the second reactor sometimes may be significantly decreased. As a result, while a strand extruded from the extruder is withdrawn to a pelletizer and formed into pellets, the mechanical strengths of the strand sometimes may be decreased. Thus, the strand sometimes may be broken down, and fine powder sometimes may be increased.

The value of [S2] is preferably more than 0, more preferably 0.2 or more.

Herein, it is preferable that the continuous bulk polymerization is conducted so that the temperature of the connection line 15 substantially corresponds to the temperature in the first reactor 10. The temperature of the connection line 15 can be determined not to be excessively lowered than the temperature in the first reactor 10. Thereby, increase in the viscosity of the intermediate composition in the connection line 15 can be prevented, and the intermediate composition can be stably supplied to the second reactor 20. The temperature of the connection line 15 can be determined not to be excessively increased relative to the temperature in the first reactor 10. Therefore, increase in the temperature in the second reactor can be prevented, and qualities such as thermal stability of the finally produced resin composition can be maintained. So that the temperature of the connection line 15 substantially corresponds to the temperature in the first reactor 10, a jacket can be placed on the connection line 15, as a temperature regulating means. It can be achieved by controlling the temperature determined on the jacket. Herein, in the case of that no heat of polymerization is generated in the connection line, any heat insulating material is placed on the connection line 15, instead of the jacket, and the temperature of the connection line 15 can be maintained. Therefore, the temperature of the connection line 15 can substantially correspond to the temperature in the first reactor 10.

Herein, a flow rate of the intermediate composition to be supplied into the second reactor 20 is defined as Q1 (in cm³/min). A flow rate of a raw material composition (containing a raw material monomer(s), a polymerization initiator(s) and a chain transfer agent(s)) to be supplied into the second reactor 20 is defined as Q2 (in cm³/min). The pumps 5, 7 and 19 are controlled so that the values of Q1 and Q2 satisfy the following formula.

$$1 \leq Q1/Q2 \leq 50$$

Thus, the flow rates of the intermediate composition and the raw material composition, both of which are supplied to the second reactor 20, are adjusted, respectively, and the chain transfer agent is diluted, and the diluted chain transfer agent is supplied into the second reactor 20. Thereby, the value of [S2] can be stably controlled since influence on the variation(s) of Q1 and/or Q2 becomes more benign in comparison with the case of that the chain transfer agent is directly supplied thereto without any dilution. As a result, the methacrylic polymer composition having the desired molecular weight distribution can be stably obtained.

When the ratio of Q1/Q2 is more than 50, in order to produce the lower molecular weight polymer, the concentration of the chain transfer agent in the raw material composition supplied into the second reactor should be considerably increased. In this case, slight changing in the value of Q2 significantly influences on the molecular weight of the lower molecular weight polymer. Therefore, it is not preferable.

When the ratio of Q1/Q2 is less than 1, the polymer produced in the first reactor can be diluted with the raw material composition to be supplied into the second reactor. Therefore, the productivity can be lowered.

Also, in the second polymerization step, it is preferable that the continuous bulk polymerization is conducted under a fully filled condition(s).

The fully filled condition(s) can prevent beforehand the occurrences of the problems such as that gel adheres to and grows on the inner surface of the reactor, and that this gel is contaminated into the reaction mixture to degrade quality of the resin composition obtained in the end. Furthermore, the fully filled conditions enable all of the inner volume of the reactor to be effectively used as a reaction space, and thereby a high productivity can be attained.

By locating the effluent port 21b of the second reactor 20 at the reactor's top, the fully filled condition is conveniently realized simply by continuously conducting the supply to and the taking from the second reactor 20.

Also, furthermore, in the second polymerization step, it is preferable that the continuous bulk polymerization is conducted under the adiabatic condition(s). The adiabatic condition(s) can prevent beforehand the occurrences of the problems such as that gel adheres to and grows on the inner surface of the reactor, and that this gel is contaminated into the reaction mixture to degrade quality of the polymer composition obtained in the end. Furthermore, the adiabatic conditions enable the polymerization reaction to become stable, and self regulating characteristics for suppressing a runaway reaction(s) can be brought about.

The adiabatic condition(s) can be realized by making the temperature of the inside of the second reactor 20 and the temperature of the outer surface thereof generally equal to each other. More specifically, this can be realized, with the use of the above-described control device (not shown in the drawings), by the supply amounts of the intermediate composition and the raw material composition B to the second reactor 20 by adjusting the operations of the pumps 5, 7 and 19 such that the temperature of the outer surface of the second reactor 20 set for the jacket (as a temperature regulating means) 23 and the temperature in the second reactor 20 detected by the temperature sensor (as a temperature detecting means) T correspond to from each other. If the temperature of the outer surface of the reactor is set at much higher temperature than the temperature in the reactor, it sometimes may add extra amount of heat into the reactor. The smaller the difference between the temperature in the reactor and the temperature of the outer surface of the reactor is, the better it is. Specifically, it is preferable to adjust the temperature difference within the range of ± about 5° C.

The temperature of the continuous bulk polymerization in the second polymerization step can be understood as the temperature in the second reactor 20. The second polymerization step is conducted at a temperature within a range of 140 to 180° C. In the case of that the continuous bulk polymerization is conducted under an adiabatic condition(s), in the second polymerization step, the temperature in the second reactor 20 depends on heat of the polymerization. A higher concentration of the polymerization initiator relative to the total amount of the intermediate composition and the raw material composition B, both of which are supplied to the second reactor 20 gives a higher polymerization conversion. As a result, the temperature in the second reactor 20 can be increased.

A time period during the continuous bulk polymerization in the second polymerization step can be understood as an average residence time in the second reactor 20. The average residence time in the second reactor 20 can be set according to the productivity of the polymer in the polymer composition, and so on. A shorter average residence time to the determined polymerization conversion gives a further improved productivity. Therefore, a shorter average residence time is preferable. However, if the average residence time is too short, increased friction may be generated in the connection line between the first reactor and the second reactor. Thus, it sometimes may be difficult to transfer the liquid composition by the pump. Accordingly, it is preferable to set the average residence time within a range from 15 minutes to 2 hours and 45 minutes. A ratio of the average residence time in the second reactor 20 relative to the average residence time in the first reactor 10 is preferably within a range from 9/1 to 1/9, and more preferably within a range from 8/2 to 2/8. The average residence time in the second polymerization step may be generally equal to the average residence time in the first polymerization step, but preferably different from it. The average residence time in the second reactor 20 can be adjusted by using of the pumps 5, 7 and 19 to change the supply amounts (or supply flow rates) of the intermediate composition and the raw material composition B to the second reactor 20. According to the present embodiment, sum of an average residence time $\theta 1$ in the first reactor 10 and an average residence time $\theta 2$ in the second reactor 20 (i.e., $\theta 1 + \theta 2$) is preferably 180 minutes or less. Accordingly, a polymer composition can be produced in an excellent productivity.

As described in the above, the polymer composition is taken out from the effluent port 21b of the second reactor 20. The obtained polymer composition comprises the generated polymer, and may further comprise the unreacted raw material monomer(s), the unreacted polymerization initiator(s), decomposed substance(s) of the polymerization initiator(s), and so on.

The polymerization conversion (x) in the methacrylic polymer composition is preferably within a range from 40 to 60% by weight. Herein, the polymerization conversion in the polymer composition corresponds to the content of the polymer in the polymer composition. A higher polymerization conversion gives a higher productivity of the polymer. However, viscosities of the intermediate composition and the polymer composition are increased, respectively. Therefore, a large stirring power is required.

Herein, a higher polymerization conversion gives a larger amount of the generated polymerization heat. Therefore, a local and sudden cooling on the reaction system tends to be easily occurred during removal of heat for maintaining the temperature of the polymerization reaction in the reaction system at a constant temperature. As a result, gel adhesion to and gel growth on the inner wall of the reactor become more remarkable. Therefore, there may be occurrences of problems such as contamination of gelled substance as an impurity into the resulting polymer composition. On the other hand, a lower polymerization conversion gives a lower productivity of the polymer. There is an increased burden on the recovery of the unreacted raw material monomer(s). Therefore, it is preferable that an appropriate polymerization conversion is determined as a target or a standard.

Herein, the difference between the temperature of the continuous bulk polymerization in the second polymerization step and the temperature of the continuous bulk polymerization in the first polymerization step is correlated to the polymerization conversion in the second polymerization step. A larger difference between the temperatures gives a larger amount of the polymer obtained in the second polymerization step. Thus, the ratio of the polymer obtained in the first polymerization step to the polymer obtained in the second polymerization step can be controlled by the temperature in each of the polymerization steps. According to the present embodiment, the first polymerization step is conducted within a range from 120 to 160° C., preferably within a range from 120 to 150° C. The second polymerization step is conducted within a range from 140 to 180° C. Furthermore, the difference (T2−T1) between the temperature (T2) of the continuous bulk polymerization in the second polymerization step and the temperature (T1) of the continuous bulk polymerization in the first polymerization step can be determined within a range from 20° C. or more to 60° C. or less. Accordingly, the average molecular weight of the polymer obtained in the second polymerization step may be lower than the average molecular weight of the polymer obtained in the first polymerization step. While the proportion of the lower molecular weight polymer is controlled by the temperature of each of the polymerization steps, the polymer composition can be obtained in an excellent productivity.

Less than 120° C. of the temperature of the first reactor gives a lower polymerization conversion obtained in the first reactor. As a result, the productivity is decreased. More than 160° C. of the temperature of the first reactor gives a higher proportion of the higher molecular weight polymer. Therefore, any desired content of the lower molecular weight polymer is not obtained.

Less than 140° C. of the temperature of the second reactor gives a lower polymerization conversion obtained in the second reactor. As a result, the productivity is reduced. More than 180° C. of the temperature of the second reactor gives depolymerization. Therefore, the desired proportion of the lower molecular weight polymer and the desired molecular weight of the lower molecular weight polymer cannot be achieved. Herein, polymerization at a higher temperature generates a larger amount of dimers as byproducts.

In the case of that the value of T2−T1 is lower than 20° C., the proportion of the lower molecular weight polymer is excessively lowered. Therefore, the average molecular weight of the resulting polymer is increased. Accordingly, burden on the extruder is increased.

In the case of that the value of T2−T1 is more than 60° C., the proportion of the lower molecular weight polymer is increased. As a result, during a strand extruded from the extruder is withdrawn to a pelletizer to form pellets, mechanical strengths of the strand are lowered, and therefore the strand is sometimes broken down, and fine powders are sometimes increased.

How the polymerization reaction conditions are set for each of the first polymerization step and the second polymerization step may vary depending on the polymer to be generated, the raw material monomer to be used, the polymerization initiator to be used, and the chain transfer agent to be used, the molecular weight distribution to be desired, the ratio of the lower molecular weight polymer to be desired, the heat resistance to be desired, thermal stability to be desired, and the productivity to be desired, and so on.

<Devolatilization Step>

As described in the above, the polymer composition (or polymerization syrup) taken from the effluent port 21b of the second reactor 20 may comprise the unreacted raw material monomer(s) and polymerization initiator(s) and so on, in addition to the generated polymer. Although this embodiment is not limited therewith, such polymer composition is preferably subjected to devolatilization to separate and recover the raw material monomer(s), etc.

Specifically, the polymer composition is transferred to the preheater 31 through the effluent line 25. In the preheater 31, the polymer composition is added with a part or all of an amount of heat necessary to volatilize the volatile component which is mainly composed of the unreacted raw material monomer. Then, the polymer composition is transferred to the devolatilizing extruder 33 via the pressure adjusting valve (not shown in the drawings), and the volatile components are at least partially removed in the devolatilizing extruder, and a residual extruded object is withdrawn to a pelletizer, and then, formed into pellets and discharged from the discharge line 35. Thereby, the resin composition comprising a methacrylic ester-based polymer can be produced in the form of the pellets.

As a method for transferring the above polymer composition, a method described in JP 4-48802 B is preferable. As a method of using a devolatilizing extruder, methods described in, for example, JP 3-49925 A, JP 51-29914 B, JP 52-17555 B, JP 1-53682 B, JP 62-89710 A and so on are preferable.

Furthermore, during or after devolatilization of the polymer composition in the devolatilizing extruder described above, the polymer composition or the extruded object can be added with mold release agents such as higher alcohols and higher fatty acid esters, an ultraviolet absorbing agent, a thermal stabilizing agent, a colorant, an antistatic agent, and so on, in order to incorporate them into the resin composition, if necessary.

The volatile component(s) removed in the devolatilizing extruder 33 comprise(s) primarily of the unreacted raw material monomer(s) and includes impurities; e.g. impurities originally contained in the raw material monomer(s), additives used, if necessary, volatile by-product(s) generated in the process of polymerization, oligomer(s) such as dimer(s) and trimer(s), decomposed substance(s) of the polymerization initiator(s), and so on. In general, a larger amount of the impurities makes the obtained resin composition colored, which is not preferable. Then, the volatile component(s) removed in the devolatilizing extruder 33 (which comprise(s) primarily of the unreacted raw material monomer(s) and includes impurities as described above, or the like) may be passed through a monomer recovery column (not shown in the drawings), and treated by means of distillation, adsorption and so on in the monomer recovery column to remove the impurities from the above-described volatile component(s). Thereby, the unreacted raw material monomer can be recovered with a high purity, so that it can be suitably reused as the raw material monomer for the polymerization. For example, a continuous distillation is conducted in the monomer recovery column to recover the unreacted raw material monomer with a high purity as a distillate liquid from the top of the monomer recovery column, and it may be transferred and recycled to the raw material monomer tank 1 after it is reserved in the recovery tank 37 once, or it may be transferred and recycled to the raw material monomer tank 1 without it being reserved in the recovery tank 37. On the other hand, the impurities removed in the monomer recovery column may be disposed as wastes.

In order to prevent the recovered raw material monomer from causing the polymerization reaction in the recovery tank 37 and/or the raw material monomer tank 1, it is preferable that a polymerization inhibitor exists in the recovery tank 37 or the raw material monomer tank 1 at a proportion, for example, within a range from 2 to 8 ppm by weight with respect to the raw material monomer, and more preferably, in addition to this, an oxygen concentration in a gas phase in the recovery tank 37 or the raw material monomer tank 1 is set within a range from 2 to 8% by volume. If the recovered raw material monomer is wanted to be preserved in the recovery tank 37 for a long time, it is preferable to reserve it at a low temperature, for example, within a range from 0 to 5° C.

As described above, with referring to the embodiment of the present invention, the method for producing the polymer composition according to the present invention is explained in detail. According to the present invention, the polymerizations can be conducted on at least two stages in series by using of at least two, or the first reactor and the second reactor. Therefore, reaction conditions of the polymerizations at the first polymerization step and the second polymerization step can be separately determined, such as, for example, temperatures, time periods (or average residence times), amount of chain transfer agent (or proportion of chain transfer agent relative to raw material composition) and amount of polymerization initiator (or proportion of polymerization initiator relative to raw material monomer(s)). According to the present invention, the first polymerization step can be conducted within a range from 120 to 160° C. by introducing a chain transfer agent, and the second polymerization step can be conducted within a range from 140 to 180° C. by additionally introducing a chain transfer agent. Thereby, the ratio of the lower molecular weight polymer to the higher molecular weight polymer, both of which are contained in the finally produced polymer composition can be controlled. Accordingly, the polymer composition having a sufficiently broadened molecular weight distribution can be more efficiently produced. Particularly, according to the present invention, the amount of the chain transfer agent supplied to each of the first and the second reactors can control the molecular weight distribution. Additionally, the variation of the polymerization temperature in each of the first and the second reactors can change the proportion of the lower molecular weight polymer, and broaden the range of the molecular weight distribution to be controlled.

However, the present invention is not limited to the above-described embodiment, and various modifications can be made. For example, three or more reactors can be used to conduct the polymerizations in three or more stages in series. Furthermore, the processes for producing the polymer composition in the above-described embodiment according to the present invention can be continuously conducted, but they may be conducted by batch procedures.

The polymer composition produced by the method according to the present invention can be preferably used as a material for a molded article. The molded article produced by using of the polymer composition obtained/obtainable by the method according to the present invention has a higher solvent resistance and a higher molding flowability, which provides advantages. The resulting molded article can be preferably utilizes as vehicle members such as a rear lamp cover, a head lamp cover, a visor, a meter panel, and so on.

EXAMPLES

Hereinafter, examples of the method for producing the polymer composition according to the present invention are described. The present invention is not limited with these examples.

Example 1

In this example, polymer composition was produced in a pellet form (as a form of a resin composition) by carrying out the continuous polymerizations at two stages according to the above-described embodiment, schematically, with referring to FIG. 1. Details are further described as follows.

98.826 parts by weight of methyl methacrylate and 0.935 part by weight of methyl acrylate were mixed. To the mixture, 0.139 part by weight of n-octyl mercaptan as a chain transfer agent and 0.100 part by weight of stearyl alcohol as a mold release agent were added to prepare a raw material monomer liquid mixture 1.

99.840 parts by weight of methyl methacrylate and 0.160 part by weight of t-amyl peroxy-2-ethylhexanoate as a polymerization initiator were mixed to prepare a polymerization initiator liquid mixture 1.

96.868 parts by weight of methyl methacrylate, 0.116 part by weight of 1,1-di(t-butylperoxy)cyclohexane as a polymerization initiator and 3.016 parts by weight of n-octyl mercaptan as a chain transfer agent were mixed to prepare a polymerization initiator liquid mixture 2.

In this example, the apparatus illustrated in FIG. 1 was used to produce polymer composition. A complete mixing type reactor with a volume of 13 L was used as the first reactor 10. A complete mixing type reactor with a volume of 6 L was used as the second reactor 20. The above-prepared raw material monomer liquid mixture 1, polymerization initiator liquid mixture 1 and polymerization initiator liquid mixture 2 were supplied to the raw material monomer tank 1, the polymerization initiator tank 3 and the polymerization initiator tank 17, respectively.

The raw material monomer liquid mixture 1 and the polymerization initiator liquid mixture 1 were continuously supplied, respectively, from the raw material monomer tank 1 and the polymerization initiator tank 3 into the first reactor 10, via the raw material supply line 9, through the supply port 11*a* located at the lower part of the reactor.

The supplies of the raw material monomer liquid mixture 1 and the polymerization initiator liquid mixture 1 to the first reactor 10 were conducted so that the ratio of these flow rates were to be 17.10:1.00 and the average residence time (θ1) in the first reactor 10 was 63.6 minutes. The temperature (T1) in the first reactor 10 was set at 120° C. The temperature of the jacket 13 surrounding the outer surface of the first reactor 10 was set at 120° C. The continuous polymerization was carried out under the adiabatic conditions without substantial heat coming in and out. This continuous polymerization was carried out under the conditions (or fully filled conditions) wherein the first reactor 10 was filled with the reaction mixture (or liquid mixture) and there was no substantial gas phase.

The reaction mixture in the first reactor 10 was continuously withdrawn as an intermediate composition through the effluent port 11b located at the top of the first reactor 10. The withdrawn intermediate composition was continuously supplied, via the connection line 15, into the second reactor 20 through the supply port 21a located at the lower part of the reactor.

The connection line 15 had a jacket surrounding the outer surface thereof. So that the temperature of the intermediate composition passing through inside of the connection line 15 corresponded to the temperature in the first reactor (or 120° C. in this example), the jacket was used to adjust and maintain these temperatures. Herein, the polymerization initiator liquid mixture 2 was continuously supplied from the polymerization initiator tank 17 to the second reactor 20 through other supply port 21c.

The supplies of the intermediate composition and the polymerization initiator liquid mixture 2 to the second reactor 20 were conducted so that the ratio of these flow rates was to be 9.54:1.00. The average residence time (θ2) in the second reactor 20 was 26.0 minutes. The temperature (T2) in the second reactor 20 was set at 175° C. The temperature of the jacket 23 surrounding the outer surface of the second reactor 20 was set at 175° C. Continuous polymerization was conducted under adiabatic conditions without substantial heat coming in and out. This continuous polymerization was carried out under the conditions (or fully filled conditions) wherein the second reactor 20 was filled with the reaction mixture (or liquid mixture) and there was no substantial gas phase.

Concentration (in % by weight) of the chain transfer agent in the total amount of the raw material monomer liquid mixture 1 and the polymerization initiator liquid mixture 1, both of which were supplied into the first reactor, was defined as [S1]. Concentration (in % by weight) of the chain transfer agent to be additionally supplied into the second reactor, in the total amount of the polymerization initiator liquid mixture 2 and the intermediate composition, both of which were supplied into the second reactor, was defined as [S2]. The values of [S1] and [S2] were 0.131% by weight and 0.286% by weight, respectively, which were calculated with the ratio of the flow rates. The flow rate of the intermediate composition flowing from the first reactor to the second reactor was defined as Q1. The flow rate of the polymerization initiator liquid mixture 2 to be supplied into the second reactor was defined as Q2. The value of Q1 was 201.85 cm³/min. The value of Q2 was 21.15 cm³/min.

The reaction mixture in the second reactor 20 was continuously withdrawn as a polymer composition through the effluent port 21b located at the top of the second reactor 20. Thereby, the resulted polymer composition was passed through the effluent line 25, and heated to 200° C. in preheater 31, volatile components such as unreacted raw material monomer(s) were removed at 240° C. at devolatilizing extruder 33 having a vent, and the devolatilized resin composition was extruded under melting conditions, and cooled with water, and subsequently cut into pellets, and taken out from the discharge line 35. Thus, the resin composition was produced in a pellet form.

The polymerization conversion (x, in % by weight) was determined from the supply weights of the raw material monomer liquid mixture 1, the polymerization initiator liquid mixture 1 and the polymerization initiator liquid mixture 2 per an unit time as well as the producing (or discharging) weight of the pellets per an unit time.

In the Examples, the molecular weight distribution of the obtained resin composition was determined by using of a gel permeation chromatography (GPC). A methacrylic resin having a known molecular weight and a narrow molecular weight distribution, which was produced by SHOWA DENKO K.K., was used as a standard agent to prepare a calibration curve by using of GPC. The calibration curve was prepared with the elution time and the molecular weight. The molecular weight distribution on each resin composition was determined.

Specifically, 40 mg of the obtained resin composition in the pellet form was dissolved in 20 ml of tetrahydrofuran (THF) as solvent to prepare a measurement sample. A measurement apparatus was used wherein two "TSKgel Super HM-H" columns and one "Super H2500" column were placed and arranged in series, both of which were produced by TOSOH CORPORATION, and RI detector was employed as a detector.

The determined molecular weight distribution curve was that fitted with a normal distribution function, as logarithm to the molecular weight in horizontal axis. If the molecular weight distribution curve had only one peak, the fitting was conducted by using of the normal distribution function represented by the following Formula (1). If the molecular weight distribution curve had two peaks, in the mixture containing two polymers having different average molecular weights, the fitting was similarly carried out by using of sum of two normal distribution functions (See the following Formula (2)). Among these two normalized distribution functions obtained from the fitting with the Formula (2), one was determined as the function relating to the lower molecular weight polymer component wherein x is smaller when y is the maximum. The area of the lower molecular weight polymer was calculated relative to the total area (hereinafter, which is also referred to as area ratio of the lower molecular weight polymer). Thus, calculated was the value corresponds to the proportion of the lower molecular weight polymer component in the polymers contained in the resin composition. Regarding these fittings, an analysis software IGOR PRO 6.0 was used which was produced by WaveMetrics, Inc.

$$y = A \times \exp\left(-\left(\frac{x-B}{C}\right)^2\right) \qquad \text{Formula (1)}$$

Herein, A, B and C are constants, respectively; x is a logarithmic value of the molecular weight; and y is a value after differentiating the concentration proportion with the logarithmic value of the molecular weight.

$$y = A \times \exp\left(-\left(\frac{x-B}{C}\right)^2\right) + D \times \exp\left(-\left(\frac{x-E}{F}\right)^2\right) \qquad \text{Formula (2)}$$

Herein, A, B, C, D, E and F are constants, respectively; x is a logarithmic value of the molecular weight; and y is a value after differentiating the concentration proportion with the logarithmic value of the molecular weight.

The molecular weight distribution curve obtained by the procedures described above is shown in FIGS. 2 (a) and (f). In the graph of the molecular weight distribution curve, "W" means the concentration proportion, and "M" means the molecular weight.

The area ratio of the lower molecular weight polymer, and the molecular weight distribution Mw/Mn were determined by the results of GPC measurement.

Herein, Mw and Mn represent weight average molecular weight and number average molecular weight with respect to the measured resin composition, respectively.

Example 2

In this example, resin composition was produced in a form of pellet according to the similar method to that described in Example 1 except the following points.

The raw material monomer liquid mixture 1 was prepared with the similar formulation to that described in Example 1.

99.823 parts by weight of methyl methacrylate and 0.177 part by weight of t-amyl peroxy-2-ethylhexanoate as a polymerization initiator were mixed to prepare a polymerization initiator liquid mixture 1.

96.900 parts by weight of methyl methacrylate, 0.084 part by weight of 1,1-di(t-butylperoxy)cyclohexane as a polymerization initiator and 3.016 parts by weight of n-octyl mercaptan as a chain transfer agent were mixed to prepare a polymerization initiator liquid mixture 2.

The temperature (T1) in the first reactor 10 was set at 130° C. The temperature of the jacket 13 surrounding the outer surface of the first reactor 10 was set at 130° C. These temperatures were adjusted to maintain 130° C. of the temperature of the intermediate composition passing through the inside of the connection line 15.

Figure 2:
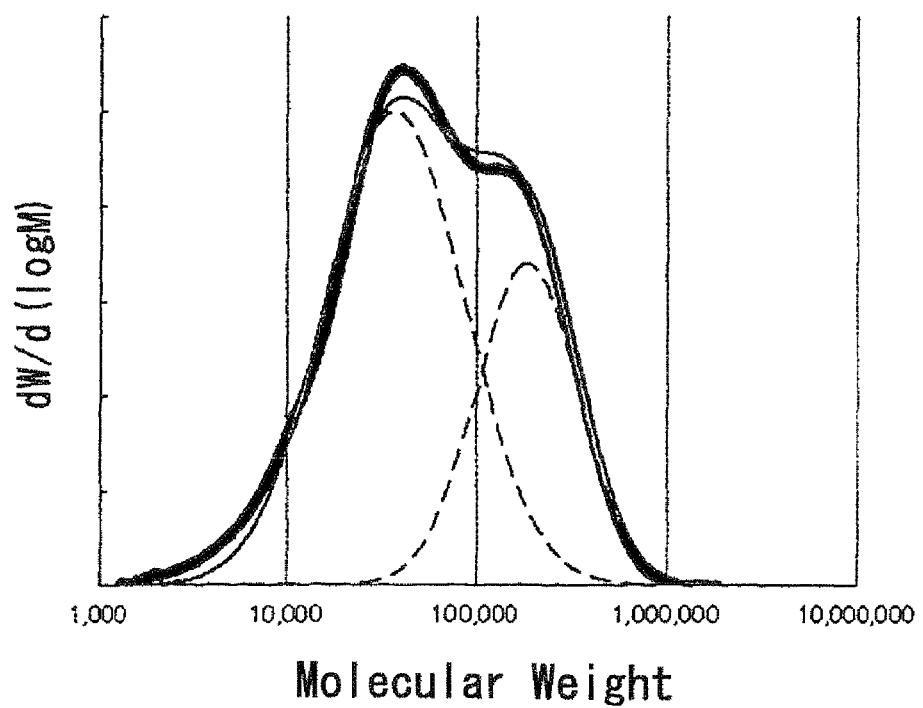
FIGS. 2(a)-2(f) is molecular weight distribution curve of methacrylic polymer composition produced in each of Examples 1-3 and Comparative Examples 1 and 2.
Figure 2:
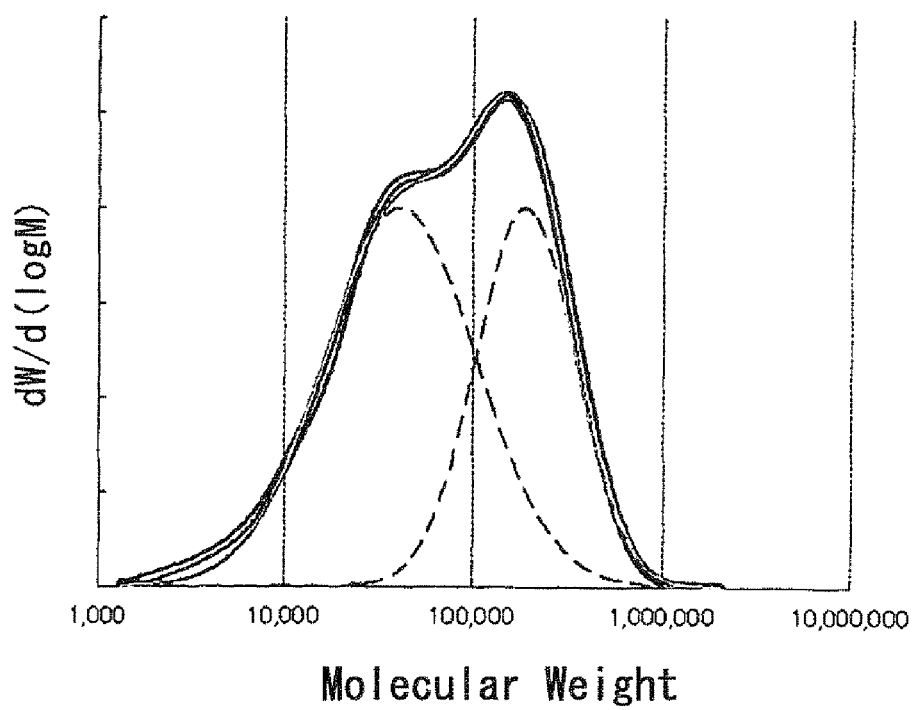
Figure 2C:
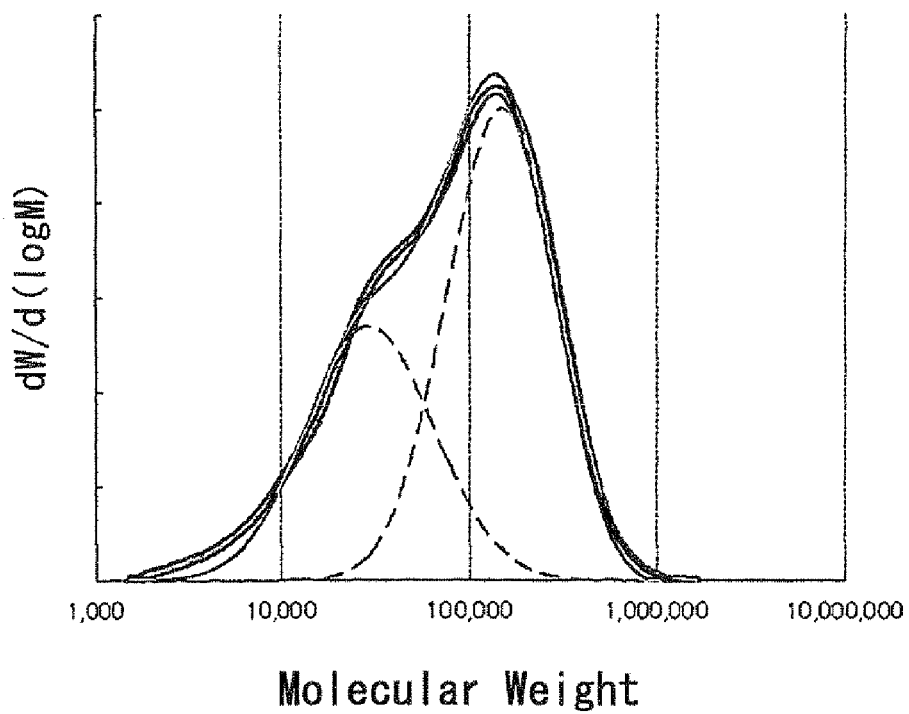
Figure 2D:
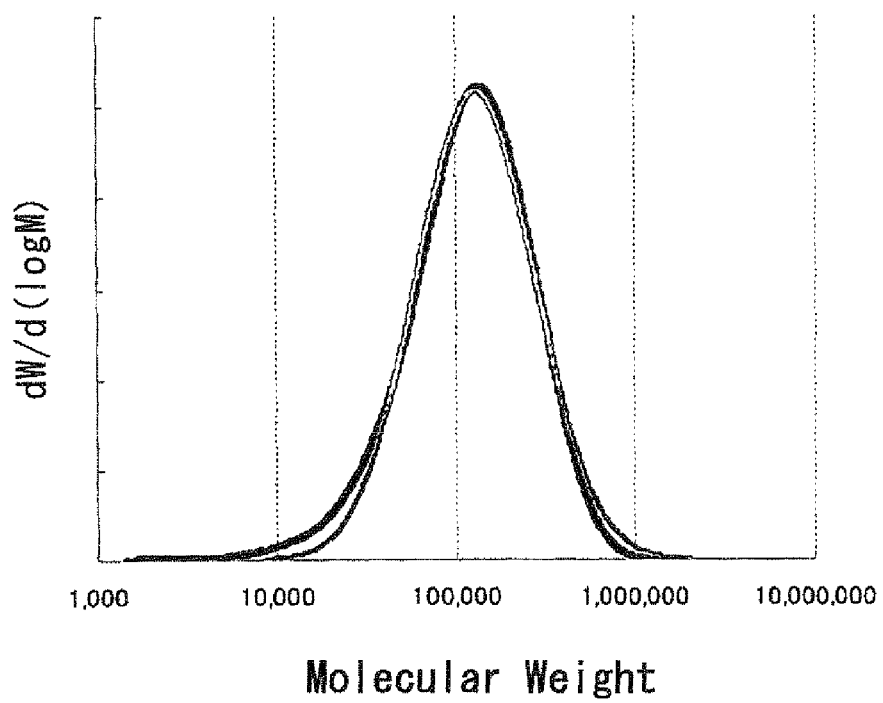
Figure 2E:
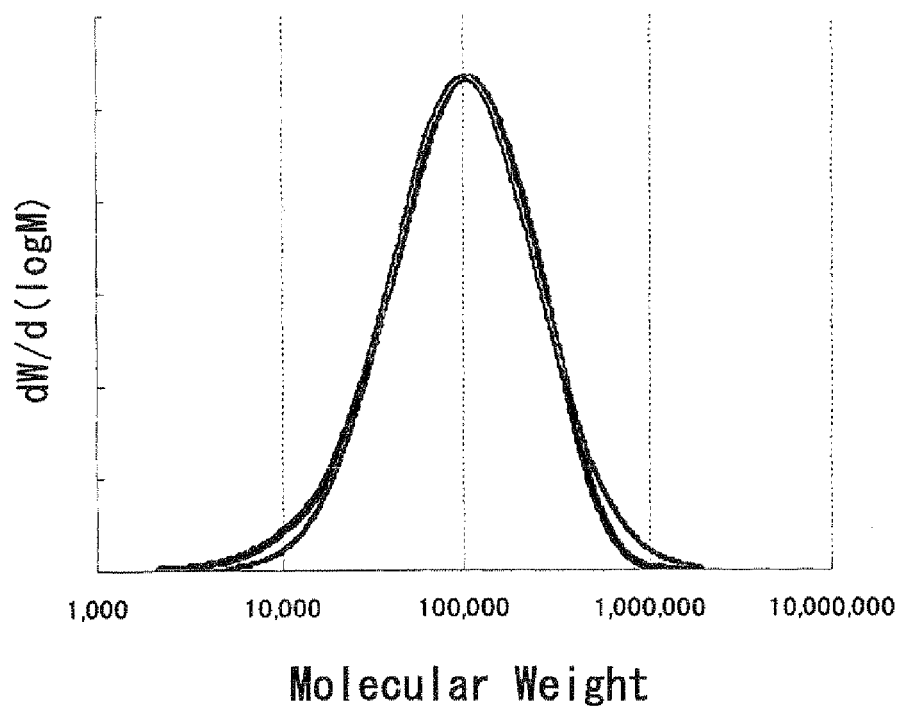
Figure 2F:
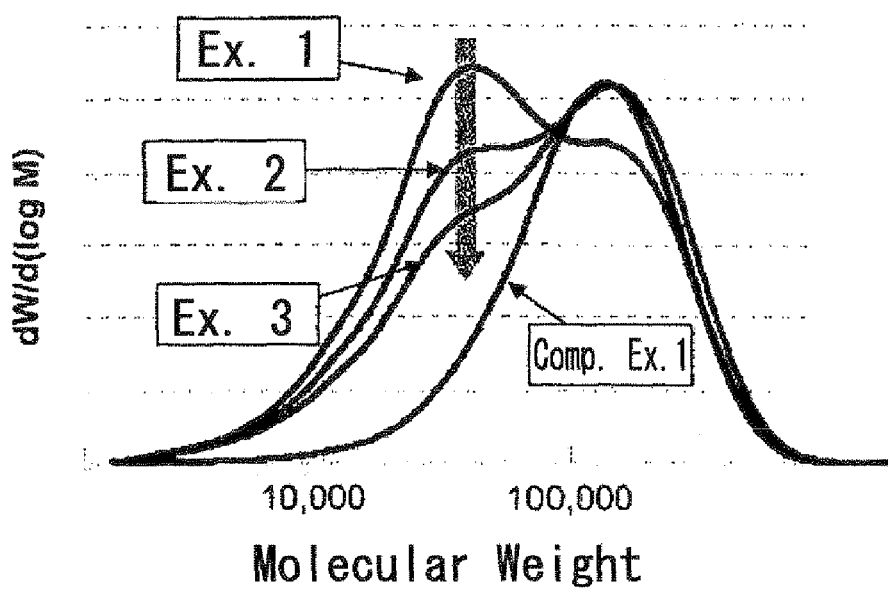

According to the similar procedures to those described in Example 1, the polymerization conversion (x in % by weight) was determined. According to the similar procedures to those described in Example 1, GPC measurement was conducted on the resulted resin composition, the molecular weight distribution curve was calculated out, and fitted with sum of two normal distribution functions. The obtained molecular weight distribution curve is shown in FIGS. 2 (b) and (f).

Furthermore, from the results of the GPC measurement, area ratio of the lower molecular weight polymer, and molecular weight distribution Mw/Mn were determined.

Example 3

In this example, resin composition was produced in a form of pellet according to the similar method to that described in Example 1 except the following points.

The raw material monomer liquid mixture 1 was prepared with the similar formulation to that described in Example 1.

99.838 parts by weight of methyl methacrylate and 0.162 part by weight of t-amyl peroxy-2-ethylhexanoate as a polymerization initiator were mixed to prepare a polymerization initiator liquid mixture 1.

96.921 parts by weight of methyl methacrylate, 0.063 part by weight of 1,1-di(t-butylperoxy)cyclohexane as a polymerization initiator, and 3.016 parts by weight of n-octyl mercaptan as a chain transfer agent were mixed to prepare a polymerization initiator liquid mixture 2.

The temperature (T1) in the first reactor 10 was set at 150° C. The temperature of the jacket 13 surrounding the outer surface of the first reactor 10 was set at 150° C. These temperatures were adjusted to maintain 150° C. of the temperature of the intermediate composition passing through the inside of the connection line 15.

According to the similar procedures to those described in Example 1, the polymerization conversion (x in % by weight) was determined. According to the similar procedures to those described in Example 1, GPC measurement was conducted on the resulted resin composition, the molecular weight distribution curve was calculated out, and fitted with sum of two normal distribution functions.

The obtained molecular weight distribution curve was shown in FIGS. 2 (c) and (f).

Furthermore, from the results of the GPC measurement, area ratio of the lower molecular weight polymer, and molecular weight distribution Mw/Mn were determined.

Example 4

In this example, resin composition was produced in a form of pellet according to the similar method to that described in Example 1 except the following points.

98.826 parts by weight of methyl methacrylate and 0.935 part by weight of methyl acrylate were mixed. To the mixture, 0.139 part by weight of n-octyl mercaptan as a chain transfer agent, and 0.100 part by weight of stearyl alcohol as a mold release agent were added to prepare a raw material monomer liquid mixture 1.

99.840 parts by weight of methyl methacrylate and 0.160 part by weight of t-amyl peroxy-2-ethylhexanoate as a polymerization initiator were mixed to prepare a polymerization initiator liquid mixture 1.

96.921 parts by weight of methyl methacrylate, 0.063 part by weight of 1,1-di(t-butylperoxy)cyclohexane as a polymerization initiator, and 3.016 parts by weight of n-octyl mercaptan as a chain transfer agent were mixed to prepare a polymerization initiator liquid mixture 2.

The supplies of the raw material monomer liquid mixture 1 and the polymerization initiator liquid mixture 1 into the first reactor 10 were conducted so that the ratio of these flow rates was 17.10:1.00, and the average residence time (θ1) in the first reactor 10 was 63.6 minutes. The temperature (T1) in the first reactor 10 was set at 140° C. The temperature of the jacket 13 surrounding the outer surface of the first reactor 10 was set at 140° C. Continuous polymerization was conducted under adiabatic conditions without substantial heat coming in and out. This continuous polymerization was carried out under the conditions (or fully filled conditions) wherein the first reactor 10 was filled with the reaction mixture (or liquid mixture) and there was no substantial gas phase.

The reaction mixture in the first reactor 10 was continuously withdrawn as an intermediate composition through an effluent port 11b placed at the top of the first reactor 10. The withdrawn intermediate composition was continuously supplied into the second reactor 20, through the connection line 15, via the supply port 21a located at the lower part of the reactor.

The connection line 15 had a jacket surrounding the outer surface thereof. The jacket was used to adjust and maintain 140° C. of the temperature of the intermediate composition passing through the inside of the connection line 15. Additionally, the polymerization initiator liquid mixture 2 was continuously supplied from the polymerization initiator tank 17 to the second reactor 20 through the other supply port 21c.

The supplies of the intermediate composition and the polymerization initiator liquid mixture 2 to the second reactor 20 were conducted so that the ratio of these flow rates was 9.54:1.00. The average residence time (θ2) in the second reactor 20 was 26.0 minutes. The temperature (T2) in the second reactor 20 was set at 175° C. The temperature of the jacket 23 surrounding the outer surface of the second reactor 20 was set at 175° C. Continuous polymerization was conducted under adiabatic conditions without substantial heat coming in and out. This continuous polymerization was carried out under the conditions (or fully filled conditions) wherein the second reactor 20 was filled with the reaction mixture (or liquid mixture) and there was no substantial gas phase.

The concentration (in % by weight) of the chain transfer agent in the total amount of the raw material monomer liquid mixture 1 and the polymerization initiator liquid mixture 1, both of which were supplied into the first reactor was defined as [S1]. The concentration (in % by weight) of the chain transfer agent additionally supplied into the second reactor in the total amount of the polymerization initiator liquid mixture 2 and the intermediate composition, both of which were supplied into the second reactor, was defined as [S2]. The values of [S1] and [S2] were 0.131% by weight and 0.286% by weight, respectively, which were calculated with the ratio of the flow rates.

Q1 was defined as the flow rate of the intermediate composition flowing from the first reactor to the second reactor. Q2 is defined as the flow rate of the polymerization initiator liquid mixture 2 supplied into the second reactor. The value of Q1 was 201.85 cm$^3$/min. The value of Q2 was 21.15 cm$^3$/min.

Figure 3A:
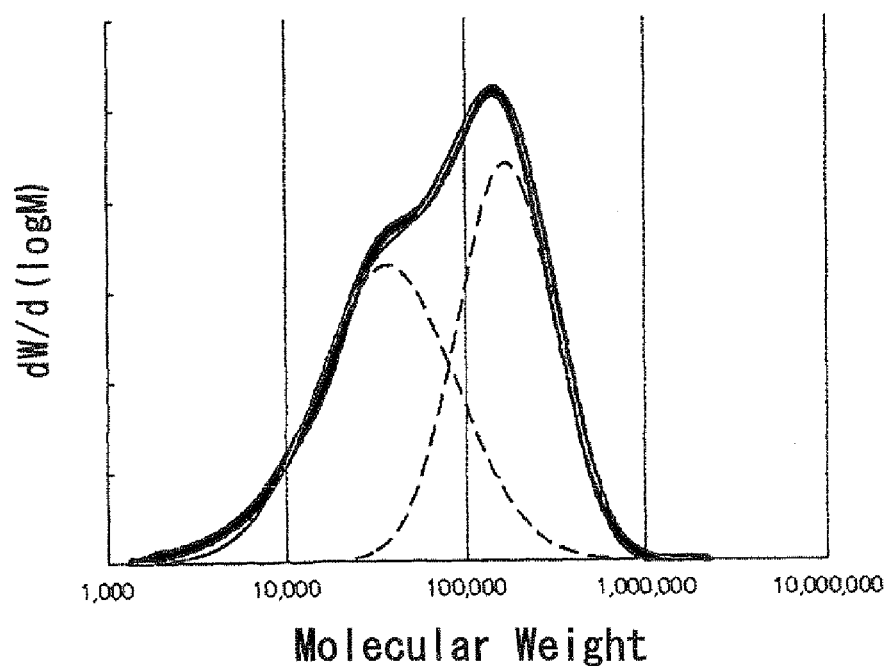
FIGS. 3(a)-3(c) is molecular weight distribution curve of methacrylic polymer composition produced in each of Examples 4 and 5.
Figure 3B:
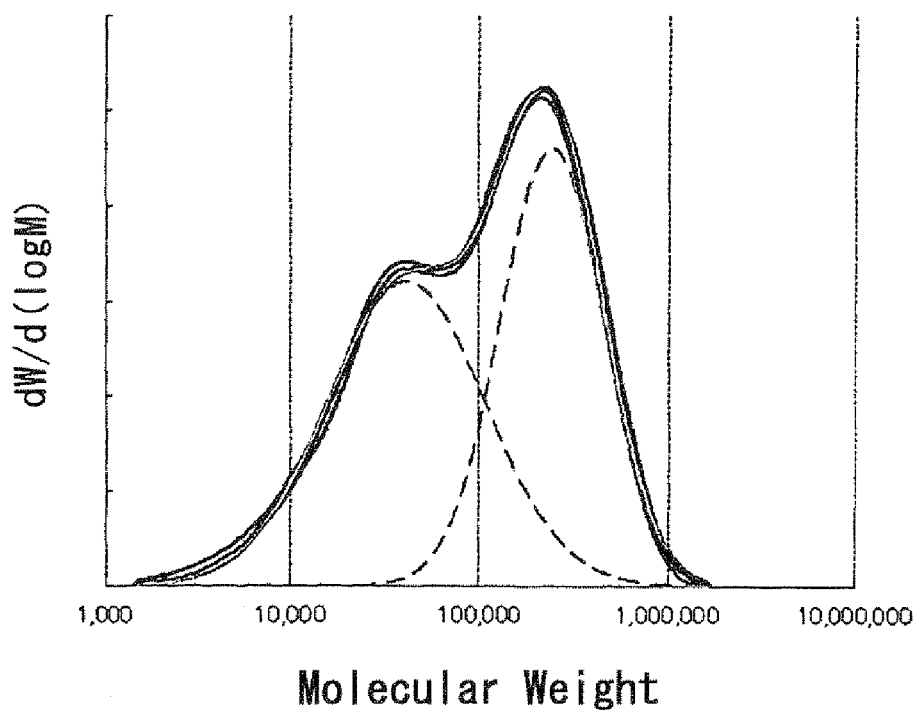
Figure 3C:
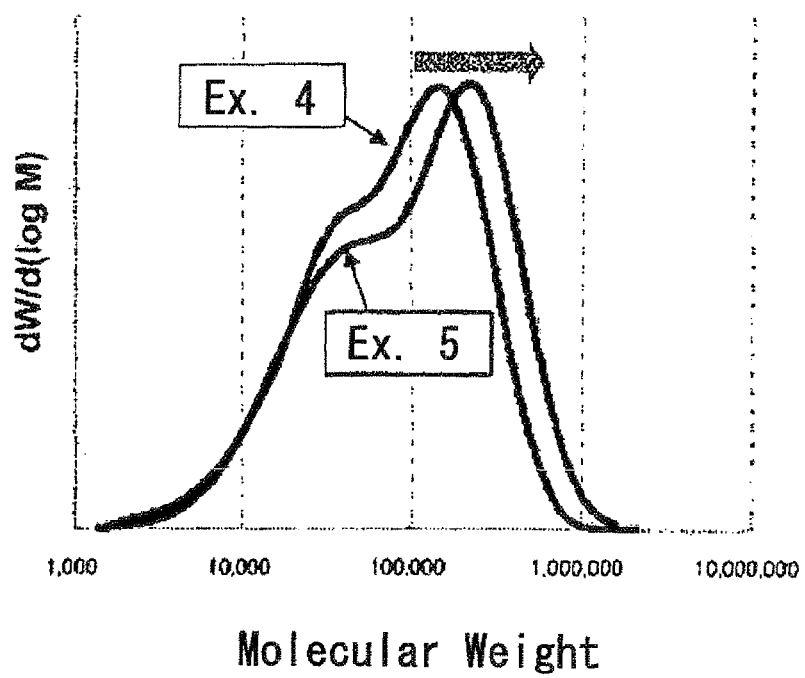

According to the similar procedures to those described in Example 1, the polymerization conversion (x in % by weight) was determined. According to the similar procedures to those described in Example 1, GPC measurement was conducted on the resulted resin composition, the molecular weight distribution curve was calculated out, and fitted with sum of two normal distribution functions. The obtained molecular weight distribution curve is shown in FIGS. 3 (a) and (c).

Furthermore, from the results of the GPC measurement, area ratio of the lower molecular weight polymer, and molecular weight distribution Mw/Mn were determined.

Example 5

In this example, resin composition was produced in a form of pellet according to the similar method to that described in Example 4 except the following points.

98.871 parts by weight of methyl methacrylate and 0.935 part by weight of methyl acrylate were mixed. To the mixture, 0.094 part by weight of n-octyl mercaptan as a chain transfer agent, and 0.100 part by weight of stearyl alcohol as a mold release agent were added to prepare a raw material monomer liquid mixture 1.

99.860 parts by weight of methyl methacrylate and 0.140 part by weight of t-amyl peroxy-2-ethylhexanoate as a polymerization initiator were mixed to prepare a polymerization initiator liquid mixture 1.

96.900 parts by weight of methyl methacrylate, 0.084 part by weight of 1,1-di(t-butylperoxy)cyclohexane as a polymerization initiator, and 3.016 parts by weight of n-octyl mercaptan as a chain transfer agent were mixed to prepare a polymerization initiator liquid mixture 2.

The concentration (in % by weight) of the chain transfer agent in the total amount of the raw material monomer liquid mixture 1 and the polymerization initiator liquid mixture 1, both of which were supplied into the first reactor, was defined as [S1]. The concentration (in % by weight) of the chain transfer agent additionally supplied into the second reactor in the total amount of the polymerization initiator liquid mixture 2 and the intermediate composition, both of which were supplied into the second reactor, was defined as [S2]. The values of [S1] and [S2] were 0.089% by weight and 0.286% by weight, respectively, which were calculated with the ratio of the flow rates.

Q1 was defined as the flow rate of the intermediate composition flowing from the first reactor to the second reactor. Q2 was defined as the flow rate of the polymerization initiator liquid mixture 2 supplied into the second reactor. The value of Q1 was 201.85 cm$^3$/min. The value of Q2 was 21.15 cm$^3$/min.

According to the similar procedures to those described in Example 1, the polymerization conversion (x in % by weight) was determined. According to the similar procedures to those described in Example 1, GPC measurement was conducted on the resulted resin composition, the molecular weight distribution curve was calculated out, and fitted with sum of two normal distribution functions. The obtained molecular weight distribution curve is shown in FIGS. 3 (b) and (c).

Furthermore, from the results of the GPC measurement, area ratio of the lower molecular weight polymer, and molecular weight distribution Mw/Mn were determined.

Example 6

In this example, resin composition was produced in a form of a pellet according to the similar method to that described in Example 1 except the following points.

98.856 parts by weight of methyl methacrylate and 0.951 part by weight of methyl acrylate were mixed. To the mixture, 0.093 part by weight of n-octyl mercaptan as a chain transfer agent, and 0.100 part by weight of stearyl alcohol as a mold release agent were added to prepare a raw material monomer liquid mixture 1.

99.747 parts by weight of methyl methacrylate and 0.253 part by weight of t-amyl peroxy-2-ethylhexanoate as a polymerization initiator were mixed to prepare a polymerization initiator liquid mixture 1.

95.775 parts by weight of methyl methacrylate, 0.915 part by weight of methyl acrylate, 0.170 part by weight of 1,1-di(t-butylperoxy)cyclohexane as a polymerization initiator and 3.140 parts by weight of n-octyl mercaptan as a chain transfer agent were added to prepare a polymerization initiator liquid mixture 2.

The supplies of the raw material monomer liquid mixture 1 and the polymerization initiator liquid mixture 1 to the first reactor 10 were conducted so that the ratio of the flow rates was 17.47:1.00, and the average residence time (θ1) in the first reactor 10 was 36.8 minutes. The temperature (T1) in the first reactor 10 was 140° C. The temperature of the jacket 13 surrounding the outer surface of the first reactor 10 was set at 140° C. Continuous polymerization was conducted under adiabatic conditions without substantial heat coming in and out. This continuous polymerization was carried out under the conditions (or fully filled conditions) wherein the first reactor 10 was filled with the reaction mixture (or liquid mixture) and there was no substantial gas phase.

The reaction mixture in the first reactor 10 was continuously withdrawn as an intermediate composition through the effluent port 11b placed at the top of the first reactor 10. The withdrawn intermediate composition was continuously supplied into the second reactor 20, through the connection line 15, via the supply port 21a placed at the lower part of the reactor.

The connection line 15 had a jacket surrounding the outer surface thereof. The jacket was used to adjust and maintain 140° C. of the temperature of the intermediate composition passing through the inside of the connection line 15. The polymerization initiator liquid mixture 2 was continuously supplied from the polymerization initiator tank 17 to the second reactor 20 through the other supply port 21c.

The supplies of the intermediate composition and the polymerization initiator liquid mixture 2 to the second reactor 20 were conducted so that the ratio of these flow rates was 12.08:1.00. The average residence time (θ2) in the second reactor 20 was 15.4 minutes. The temperature (T2) in the second reactor 20 was set at 175° C. The temperature of the jacket 23 surrounding the outer surface of the second reactor 20 was set at 175° C. Continuous polymerization was conducted under adiabatic conditions without substantial heat coming in and out. This continuous polymerization was carried out under the conditions (or fully filled conditions) wherein the second reactor 20 was filled with the reaction mixture (or liquid mixture) and there was no substantial gas phase.

The concentration (in % by weight) of the chain transfer agent in the total amount of the raw material monomer liquid mixture 1 and the polymerization initiator liquid mixture 1, both of which were supplied into the first reactor, was defined as [S1]. The concentration (in % by weight) of the chain transfer agent additionally supplied into the second reactor in the total amount of the polymerization initiator liquid mixture 2 and the intermediate composition, both of which were supplied into the second reactor, was defined as [S2]. The values of [S1] and [S2] were 0.088% by weight and 0.240% by weight, respectively, which were calculated with the ratio of the flow rates.

The value of Q1 was defined as the flow rate of the intermediate composition flowing from the first reactor to the second reactor. The value of Q2 was defined as the flow rate of the polymerization initiator 2 supplied into the second reactor. The value of Q1 was 348.96 cm$^3$/min. The value of Q2 was 28.89 cm$^3$/min.

According to the similar procedures to those described in Example 1, the polymerization conversion (x in % by weight) was determined. According to the similar procedures to those described in Example 1, GPC measurement was conducted on the resulted resin composition, the molecular weight distribution curve was calculated out, and fitted with two normal distribution functions. The obtained molecular weight distribution curve was shown in FIGS. 4 (*a*) and (*c*). Furthermore, from the results of the GPC measurement, area ratio of the lower molecular weight polymer, and molecular weight distribution Mw/Mn were determined.

Example 7

In this example, resin composition was produced in a form of pellet according to the similar method to that described in Example 6 except the following points.

98.856 parts by weight of methyl methacrylate and 0.951 part by weight of methyl acrylate were mixed. To the mixture, 0.093 part by weight of n-octyl mercaptan as a chain transfer agent, and 0.100 part by weight of stearyl alcohol as a mold release agent were added to prepare a raw material monomer liquid mixture 1.

99.747 parts by weight of methyl methacrylate and 0.253 part by weight of t-amyl peroxy-2-ethylhexanoate as a polymerization initiator were mixed to prepare a polymerization initiator liquid mixture 1.

92.692 parts by weight of methyl methacrylate, 0.915 part by weight of methyl acrylate, 0.183 part by weight of 1,1-di(t-butylperoxy)cyclohexane as a polymerization initiator, and 6.210 parts by weight of n-octyl mercaptan as a chain transfer agent were mixed to prepare a polymerization initiator liquid mixture 2.

The concentration (in % by weight) of the chain transfer agent in the total amount of the raw material monomer liquid mixture 1 and the polymerization initiator liquid mixture 1, both of which were supplied into the first reactor, was defined as [S1]. The concentration (in % by weight) of the chain transfer agent additionally supplied into the second reactor in the total amount of the polymerization initiator liquid mixture 2 and the intermediate composition, both of which were supplied into the second reactor, was defined as [S2]. The values of [S1] and [S2] were 0.088% by weight and 0.475% by weight, respectively, which were calculated with the ratio of the flow rates.

Q1 was defined as the flow rate of the intermediate composition flowing from the first reactor to the second reactor. Q2 was defined as the flow rate of the polymerization initiator liquid mixture 2 supplied into the second reactor. The value of Q1 was 348.96 cm$^3$/min. The value of Q2 was 28.89 cm$^3$/min.

Figure 4A:
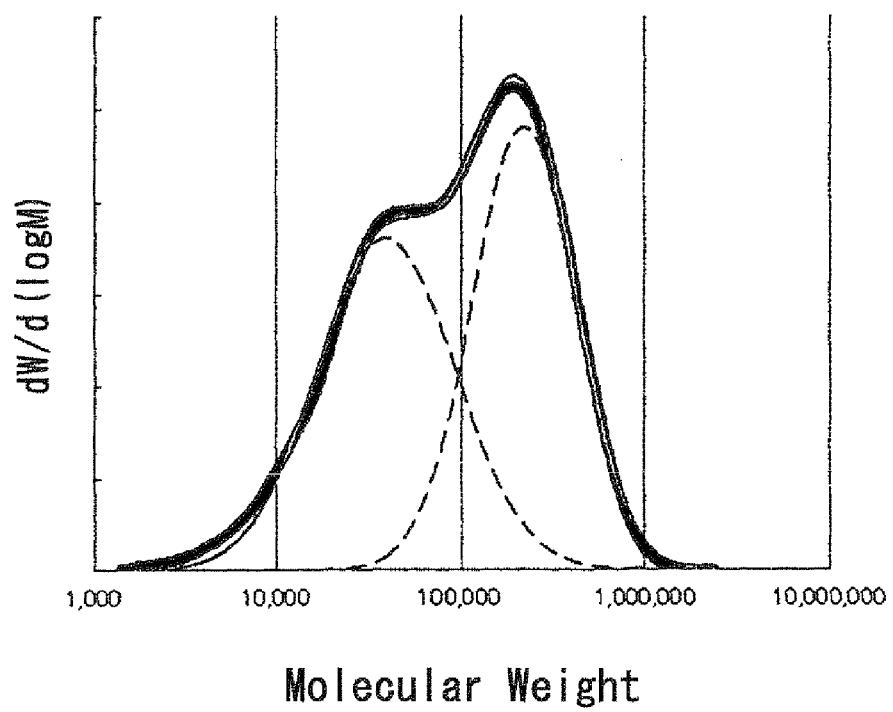
FIGS. 4(a)-4(c) is molecular weight distribution curve of methacrylic polymer composition produced in each of Examples 6 and 7.
Figure 4B:
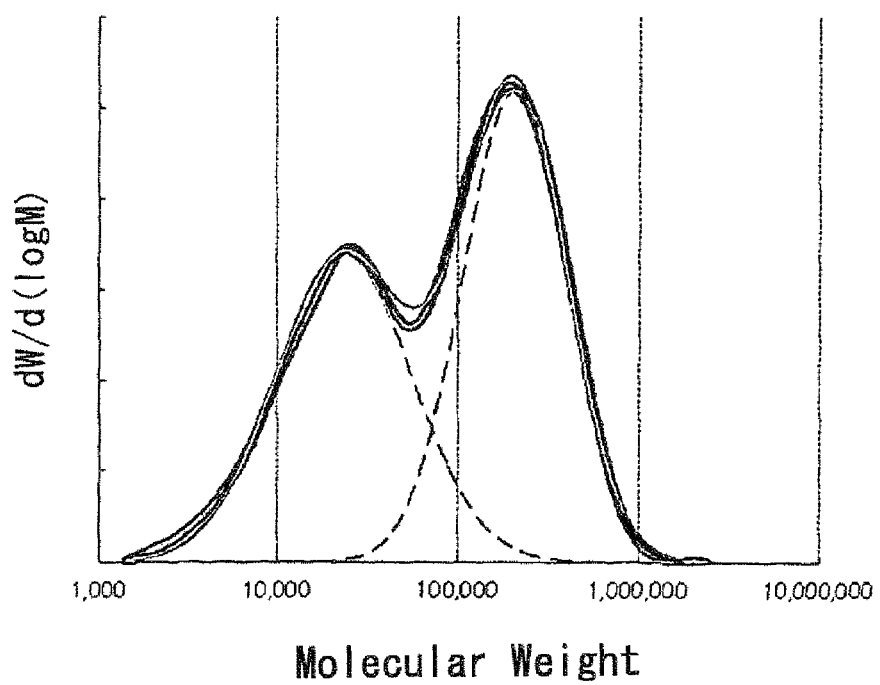
Figure 4C:
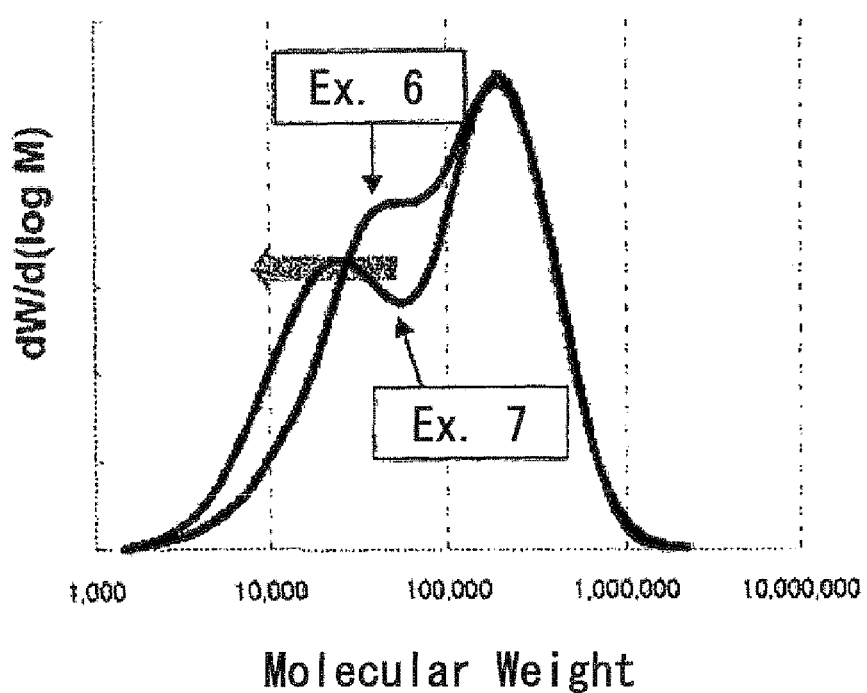

According to the similar procedures to those described in Example 1, the polymerization conversion (x in % by weight) was determined. According to the similar procedures to those described in Example 1, GPC measurement was conducted on the resulted resin composition, the molecular weight distribution curve is calculated out, and fitted with two normal distribution functions. The obtained molecular weight distribution curve is shown in FIGS. 4 (*b*) and (*c*). Furthermore, from the results of the GPC measurement, area ratio of the lower molecular weight polymer, and molecular weight distribution Mw/Mn were determined.

Comparative Example 1

In this comparative example, as described hereinafter, a polymerization inhibitor was introduced into the second reactor 20 to terminate the polymerization. Thereby, the resin composition was produced, which corresponded to that prepared in one step polymerization. The molecular weight distribution was analyzed.

98.956 parts by weight of methyl methacrylate and 0.935 part by weight of methyl acrylate were mixed. To the mixture, 0.009 part by weight of n-octyl mercaptan as a chain transfer agent, and 0.100 part by weight of stearyl alcohol as a mold release agent were added to prepare a raw material monomer liquid mixture 1.

99.816 parts by weight of methyl methacrylate and 0.184 part by weight of 1,1-di(t-butylperoxy)cyclohexane as a polymerization initiator were mixed to prepare a polymerization initiator liquid mixture 1.

99.99995 parts by weight of methyl methacrylate and 0.00005 part by weight of 2,6-bis(tert-butyl)-4-methylphenol as the polymerization inhibitor were mixed to prepare a polymerization inhibitor liquid mixture.

In this comparative example, the apparatus illustrated in FIG. 1 was employed to produce resin composition. 13 L volume of a complete mixing type reactor as the first reactor 10 was used. 6 L volume of a complete mixing type reactor was used as the second reactor 20. The raw material monomer liquid mixture 1, the polymerization initiator liquid mixture 1 and the polymerization inhibitor liquid mixture, which were prepared above, were supplied into the raw material monomer tank 1, the polymerization initiator tank 3 and the polymerization initiator tank 17, respectively.

The raw material monomer liquid mixture 1 and the polymerization initiator liquid mixture 1 was continuously supplied, respectively, from the raw material monomer tank 1 and the polymerization initiator tank 3 to the first reactor 10, through the raw material supply line 9, via the supply port 11a located at the lower part of the reactor.

The supplies of the raw material monomer liquid mixture 1 and the polymerization initiator liquid mixture 1 into the first reactor 10 were conducted so that the ratio of these flow rates was 17.10:1.00, and the average residence time (θ1) in the first reactor 10 was 63.6 minutes. The temperature (T1) in the first reactor 10 was set at 175° C. The temperature of the jacket 13 surrounding the outer surface of the first reactor 10 was set at 175° C. Continuous polymerization was conducted under adiabatic conditions without substantial heat coming in and out. This continuous polymerization was carried out under the conditions (or fully filled conditions) wherein the first reactor 10 was filled with the reaction mixture (or liquid mixture) and there was no substantial gas phase.

The reaction mixture in the first reactor 10 was continuously withdrawn as an intermediate composition through the effluent port 11b located at the top of the first reactor 10. The withdrawn intermediate composition was continuously supplied to the second reactor 20, through the connection line 15, via the supply port 21a located at the lower part of the reactor.

The connection line 15 had a jacket surrounding the outer surface thereof. The jacket was used to adjust and maintain 175° C. of the temperature of the intermediate composition passing through the inside of the connection line 15. Additionally, the polymerization inhibitor liquid mixture was continuously supplied from the polymerization initiator tank 17 to the second reactor 20 through the other supply port 21c.

The supplies of the intermediate composition and the polymerization inhibitor liquid mixture to the second reactor 20 were conducted so that the ratio of these flow rates was 9.54:1.00. The average residence time (θ2) in the second reactor 20 was 26.0 minutes. The temperature (T2) in the second reactor 20 was set at 175° C. The temperature of the jacket 23 surrounding the outer surface of the second reactor 20 was set at 175° C. Continuous polymerization was conducted under adiabatic conditions without substantial heat coming in and out. This continuous polymerization was carried out under the conditions (or fully filled conditions) wherein the second reactor 20 was filled with the reaction mixture (or liquid mixture) and there was no substantial gas phase.

The concentration (in % by weight) of the chain transfer agent in the total amount of the raw material monomer liquid mixture 1 and the polymerization initiator liquid mixture 1, both of which were supplied into the first reactor, was defined as [S1]. The value of [S1] was 0.094% by weight, which was calculated with the ratio of the flow rates.

Q1 was defined as the flow rate of the intermediate composition flowing from the first reactor to the second reactor. Q2 was defined as the flow rate of the polymerization inhibitor liquid mixture supplied into the second reactor. The value of Q1 was 201.85 cm$^3$/min. The value of Q2 was 21.15 cm$^3$/min.

The reaction mixture in the second reactor 20 was continuously withdrawn as a polymer composition through the effluent port 21b located at the top of the second reactor 20. Thereby, the resulted polymer composition was passed through the effluent line 25, and heated to 200° C. in preheater 31, volatile components such as unreacted raw material monomer(s) were removed at 240° C. at devolatilizing extruder 33 having a vent, and the devolatilized resin composition was extruded in melting conditions, and cooled with water, and subsequently cut into pellets, and taken out from the discharge line 35. Thus, the resin composition was produced in a pellet form.

According to the similar procedures to those described in Example 1, the polymerization conversion (x in % by weight) was determined. According to the similar procedures to those described in Example 1, GPC measurement was conducted on the resulted resin composition, the molecular weight distribution curve was calculated out, and fitted with a single normal distribution function. The obtained molecular weight distribution curve is shown in FIGS. 2 (d) and (f). Furthermore, from the results of the GPC measurement, area ratio of the lower molecular weight polymer, and molecular weight distribution Mw/Mn were determined.

Comparative Example 2

In this comparative example, resin composition was produced in a form of a pellet according to the similar method to that described in Example 6 except the following points.

98.817 parts by weight of methyl methacrylate and 0.951 part by weight of methyl acrylate were mixed. To the mixture, 0.132 part by weight of n-octyl mercaptan as a chain transfer agent, and 0.100 part by weight of stearyl alcohol as a mold release agent were added to prepare a raw material monomer liquid mixture 1.

99.719 parts by weight of methyl methacrylate and 0.281 part by weight of t-amyl peroxy-2-ethylhexanoate as a polymerization initiator were mixed to prepare a polymerization initiator liquid mixture 1.

97.930 parts by weight of methyl methacrylate, 0.915 part by weight of methyl acrylate, 0.105 part by weight of 1,1-di(t-butylperoxy)cyclohexane as a polymerization initiator, and 1.050 part by weight of n-octyl mercaptan as a chain transfer agent were mixed to prepare a polymerization initiator liquid mixture 2.

The concentration (in % by weight) of the chain transfer agent in the total amount of the raw material monomer liquid mixture 1 and the polymerization initiator liquid mixture 1, both of which were supplied into the first reactor, was defined as [S1]. The concentration (in % by weight) of the chain transfer agent additionally supplied into the second reactor in the total amount of the polymerization initiator liquid mixture 2 and the intermediate composition, both of which were supplied into the second reactor, was defined as [S2]. The values of [S1] and [S2] were 0.125% by weight and 0.080% by weight, respectively, which were calculated with the rate of the flow rates.

Q1 was defined as the flow rate of the intermediate composition flowing from the first reactor to the second reactor. Q2 was defined as the flow rate of the polymerization initiator liquid mixture 2 supplied into the second reactor. The value of Q1 was 348.96 cm$^3$/min. The value of Q2 was 28.89 cm$^3$/min.

According to the similar procedures to those described in Example 1, the polymerization conversion (x in % by weight) was determined. According to the similar procedures to those described in Example 1, GPC measurement was conducted on the resulted resin composition, the molecular weight distribution curve was calculated out, and fitted with a single normal distribution function. The obtained molecular weight distribution curve is shown in FIG. 2 (e). Furthermore, from the results of the GPC measurement, area ratio of the lower molecular weight polymer, and molecular weight distribution Mw/Mn were determined.

In Examples 1-7 and Comparative Examples 1 and 2, the polymers could be stably produced without any problems such as any runaway reaction, and obstruction in the line or gel adhesion inside of the reactor.

The results of Examples 1-7 and Comparative Examples 1 and 2 are shown in Table 1 below.

although additional chain transfer agent was supplied into the second reactor, the molecular weight distribution could not be significantly broadened since the value of [S2]/[S1] was small.

As it can be understood with referring to Table 1 and FIGS. 2 (a)-(f), the area ratio of the lower molecular weight polymer component in the molecular weight distribution curve obtained by GPC can be changed by fixing the temperature T2 in the second reactor at 175° C., and changing the temperature T1 in the first reactor. Accordingly, the content of the lower molecular weight polymer in the resin composition can be varied. Specifically, with the value of T1 being higher, the area ratio of the lower molecular weight polymer component was smaller.

As it can be understood with referring to Table 1 and FIGS. 3 (a)-(c), the molecular weight of the higher molecular weight polymer can be increased, and the molecular

TABLE 1

| | T1 (° C.) | T2 (° C.) | T2 − T1 (° C.) | θ1 (min) | θ2 (min) | θ1 + θ2 (min) | x (wt. %) | [S1] (wt. %) | [S2] (wt. %) | [S2]/[S1] | Q1/Q2 | Mw/Mn | Area ratio of lower molecular weight polymer |
|---|---|---|---|---|---|---|---|---|---|---|---|---|---|
| Ex. 1 | 120 | 175 | 55 | 63.6 | 26.0 | 89.6 | 53 | 0.131 | 0.286 | 2.18 | 9.54 | 3.4 | 0.68 |
| Ex. 2 | 130 | 175 | 45 | 63.6 | 26.0 | 89.6 | 55 | 0.131 | 0.286 | 2.18 | 9.54 | 3.5 | 0.62 |
| EX. 3 | 150 | 175 | 25 | 63.6 | 26.0 | 89.6 | 55 | 0.131 | 0.286 | 2.18 | 9.54 | 3.3 | 0.41 |
| Ex. 4 | 140 | 175 | 35 | 63.6 | 26.0 | 89.6 | 54 | 0.131 | 0.286 | 2.18 | 9.54 | 3.4 | 0.53 |
| Ex. 5 | 140 | 175 | 35 | 63.6 | 26.0 | 89.6 | 52 | 0.089 | 0.286 | 3.21 | 9.54 | 4.3 | 0.53 |
| Ex. 6 | 140 | 175 | 35 | 36.8 | 15.4 | 52.2 | 54 | 0.088 | 0.240 | 2.73 | 12.1 | 3.8 | 0.52 |
| Ex. 7 | 140 | 175 | 35 | 36.8 | 15.4 | 52.2 | 54 | 0.088 | 0.475 | 5.40 | 12.1 | 5.2 | 0.49 |
| Comp. Ex. 1 | 175 | 175 | 0 | 63.6 | — | — | 57 | 0.094 | 0 | 0 | 9.54 | 2.1 | — |
| Comp. Ex. 2 | 140 | 175 | 35 | 36.8 | 15.4 | 52.2 | 55 | 0.125 | 0.080 | 0.64 | 12.1 | 2.3 | — |

With referring to FIGS. 2-4, it can be seen that each of the molecular weight distribution curves of the resin compositions produced in Examples 1-7 shows distribution having two peaks. Therefore, it can be seen that, in Examples 1-7, polymers having different average molecular weights (or lower molecular weight polymer and higher molecular weight polymer) were produced in the first polymerization step and the second polymerization step. Whereas, with referring to FIGS. 2 (d)-(f), it can be seen that each of the molecular weight distribution curves of the resin compositions produced in Comparative Examples 1 and 2 shows distribution having a single peak. Therefore, in the Comparative Example 1, wherein the polymerization inhibitor was supplied into the second reactor 20 and polymerization was conducted in a single stage, it can be seen that polymers having different average molecular weights could not be produced. In the Comparative Example 2, wherein the ratio of [S1]/[S2] is smaller than 1.7, it can be seen that polymers having almost the same average molecular weight could be produced in the first polymerization step and the second polymerization step.

Furthermore, with referring to Table 1, it can be seen that, in Examples 1-7, the molecular weight distribution Mw/Mn is within a range from 3.3 to 5.2, and that the molecular weight distribution is broadened in comparison with Comparative Examples 1 and 2 wherein the molecular weight distribution Mw/Mn is 2.1 or 2.3, respectively.

As described above, it can be seen that the resin compositions containing lower molecular weight polymer and higher molecular weight polymer and having broader molecular weight distribution can be produced by two stage continuous bulk polymerizations and adjustment of the ratio of [S2]/[S1] to 1.7 or more. In Comparison Example 2, weight distribution can be broadened, by fixing the value of [S2], and lowering the value of [S1].

As it can be understood with referring to Table 1 and FIGS. 4 (a)-(c), the molecular weight of the lower molecular weight polymer can be reduced, and the molecular weight distribution can be broadened, by fixing the value of [S1], and increasing the value of [S2].

As described above, it can be seen that the molecular weight distribution depends on the balance of the values of [S1] and [S2].

INDUSTRIAL APPLICABILITY

According to the present invention, a mixture containing a lower molecular weight polymer and a higher molecular weight polymer can be continuously and easily produced. Consequently, a methacrylic polymer composition can be produced in a higher productivity, wherein the molecular weight distribution is broad and the mixing ratio of a lower molecular weight polymer and a higher molecular weight polymer is controlled. The methacrylic polymer composition obtained/obtainable by the method according to the present invention can be preferably utilized as a material for a molded article.

EXPLANATIONS OF LETTERS OR NUMERALS

1: raw material monomer tank (or supply source of a raw material monomer and an optional chain transfer agent)
3: polymerization initiator tank (or supply source of a polymerization initiator and an optional raw material monomer and an optional chain transfer agent)
5: pump
7: pump 9: raw material supply line
10: first reactor
11a: supply port
11b: effluent port
11c: other supply port
13: jacket (as temperature regulating means)
14: stirrer
15: connection line
17: polymerization initiator tank (or supply source of an additional raw material monomer, an additional polymerization initiator and an additional chain transfer agent)
19: pump
20: second reactor
21a: supply port
21b: effluent port
21c: other supply port
23: jacket (as temperature regulating means)
24: stirrer
25: effluent line
31: preheater
33: devolatilizing extruder
35: discharge line
37: recovery tank
T: temperature sensor (as temperature detecting means)

The invention claimed is:

1. A method for producing a methacrylic polymer composition, which comprises
a first polymerization step wherein a raw material composition A comprising a raw material monomer A containing no less than 50% by weight of methyl methacrylate, a polymerization initiator A, and a chain transfer agent A is supplied into a first complete mixing type reactor through a supply port of the reactor, and the raw material composition A is subjected to a continuous bulk polymerization in the first complete mixing type reactor, and a resulting intermediate composition is withdrawn through an effluent port of the first complete mixing type reactor; and
a second polymerization step wherein a raw material composition B comprising a raw material monomer B containing no less than 50% by weight of methyl methacrylate, a polymerization initiator B, and a chain transfer agent B, and the intermediate composition withdrawn in the first polymerization step are supplied into a second complete mixing type reactor through a supply port of the reactor, and the raw material composition B and the intermediate composition are further subjected to a continuous bulk polymerization in the second complete mixing type reactor, and a resulting methacrylic polymer composition is withdrawn through an effluent port of the second complete mixing type reactor;

wherein the following formulae (I), (II), (III), (IV) and (V) are satisfied:

$$120 \leq T1 \leq 160 \qquad (I)$$

$$140 \leq T2 \leq 180 \qquad (II)$$

$$20 \leq T2 - T1 \leq 60 \qquad (III)$$

$$1.7 \leq [S2]/[S1] \qquad (IV)$$

$$1 \leq Q1/Q2 \leq 50 \qquad (V)$$

wherein
T1 is a temperature (° C.) in the first complete mixing type reactor in the first polymerization step,
T2 is a temperature (° C.) in the second complete mixing type reactor in the second polymerization step,
[S1] is a concentration (% by weight) of the chain transfer agent A in the raw material composition A supplied into the first complete mixing type reactor,
[S2] is a concentration (% by weight) of the chain transfer agent B relative to the total amount of the raw material composition B and the intermediate composition, both of which are supplied into the second complete mixing type reactor,
Q1 is a flow rate ($cm^3$/min) of the intermediate composition supplied into the second complete mixing type reactor, and
Q2 is a flow rate ($cm^3$/min) of the raw material composition B supplied in the second complete mixing type reactor.

2. The method according to claim 1, wherein the following formulae (VI) and (VII) are further satisfied:

$$40 \leq x \leq 60 \qquad (VI)$$

$$\theta1 + \theta2 \leq 180 \qquad (VII)$$

wherein
x is a polymerization conversion (% by weight) of the methacrylic polymer composition withdrawn through the effluent port of the second complete mixing type reactor,
θ1 is an average residence time (min) in the first complete mixing type reactor in the first polymerization step, and
θ2 is an average residence time (min) in the second complete mixing type reactor in the second polymerization step.

3. The method according to claim 1, wherein each of the effluent ports of the first and second complete mixing type reactors is located on a top of each of the reactors.

4. The method according to claim 1, wherein the continuous bulk polymerizations in the first polymerization step and the second polymerization step are conducted under adiabatic conditions.

* * * * *